United States Patent
Allan et al.

(10) Patent No.: US 10,917,927 B2
(45) Date of Patent: Feb. 9, 2021

(54) LOCAL IDENTIFIER LOCATOR NETWORK PROTOCOL (ILNP) BREAKOUT

(71) Applicant: Telefonaktiebolaget LM Ericsson (publ), Stockholm (SE)

(72) Inventors: David Ian Allan, San Jose, CA (US); Joel Halpern, Leesburg, VA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/612,953

(22) PCT Filed: May 12, 2017

(86) PCT No.: PCT/IB2017/052827
§ 371 (c)(1),
(2) Date: Nov. 12, 2019

(87) PCT Pub. No.: WO2018/207006
PCT Pub. Date: Nov. 15, 2018

(65) Prior Publication Data
US 2020/0170056 A1    May 28, 2020

(51) Int. Cl.
*H04L 12/28* (2006.01)
*H04W 76/12* (2018.01)
(Continued)

(52) U.S. Cl.
CPC .......... *H04W 76/12* (2018.02); *H04W 8/082* (2013.01); *H04W 36/08* (2013.01); *H04W 76/11* (2018.02); *H04W 76/15* (2018.02); *H04W 88/16* (2013.01)

(58) Field of Classification Search
None
See application file for complete search history.

(56) References Cited

U.S. PATENT DOCUMENTS 6,728,522 B1   4/2004   Marrah et al.
8,374,116 B2   2/2013   Kitchin
(Continued)

FOREIGN PATENT DOCUMENTS

EP   2782372 A1   9/2014
EP   2858315 A1   4/2015
(Continued)

OTHER PUBLICATIONS

Atkinson, et al., "ICMP Locator Update message for ILNPv6; draft-irtf-rrg-ilnp-icmpv6-06," Internet Draft, IETF Trust, Jul. 10, 2012, pp. 1-12.
(Continued)

*Primary Examiner* — Kwang B Yao
*Assistant Examiner* — Juvena W Loo
(74) *Attorney, Agent, or Firm* — Nicholson, De Vos, Webster & Elliott, LLP

(57) ABSTRACT

A method is implemented by a network device functioning as an evolved universal terrestrial radio access network (E-UTRAN) node B (eNodeB) in a cellular communication network to support incremental deployment of identifier locator network protocol (ILNP) breakout in the cellular communication network. The method includes advertising a first access point name (APN) and a second APN to a user equipment (UE), where the first APN is associated with a user plane packet gateway (P-GWu) that is implemented at the source eNodeB, and where the second APN is associated with a packet gateway (P-GW) in a core of the cellular communication network.

14 Claims, 13 Drawing Sheets

(51) Int. Cl.
*H04W 76/15* (2018.01)
*H04W 76/11* (2018.01)
*H04W 8/08* (2009.01)
*H04W 36/08* (2009.01)
*H04W 88/16* (2009.01)

(56) References Cited

U.S. PATENT DOCUMENTS

| | | |
|---|---|---|
| 8,503,416 B2 | 8/2013 | Haddad et al. |
| 8,510,551 B1 | 8/2013 | Desai et al. |
| 8,537,816 B2 | 9/2013 | Anumala et al. |
| 8,625,465 B1 | 1/2014 | Rekhter et al. |
| 8,867,355 B2 | 10/2014 | Klein et al. |
| 8,879,394 B2 | 11/2014 | Allan et al. |
| 9,894,554 B2* | 2/2018 | Luo ............ H04W 40/36 |
| 10,015,132 B1 | 7/2018 | Qin et al. |
| 10,098,042 B2* | 10/2018 | Lee ............ H04W 36/0011 |
| 10,582,428 B2 | 3/2020 | Xu et al. |
| 10,716,045 B2* | 7/2020 | Allan ............ H04W 36/0055 |
| 10,772,013 B2 | 9/2020 | Fujishiro et al. |
| 2001/0021175 A1 | 9/2001 | Haverinen |
| 2004/0066745 A1 | 4/2004 | Joe |
| 2004/0206408 A1 | 10/2004 | Peters et al. |
| 2004/0264374 A1 | 12/2004 | Yu et al. |
| 2005/0007954 A1 | 1/2005 | Sreemanthula et al. |
| 2005/0063307 A1 | 3/2005 | Samuels et al. |
| 2005/0141545 A1 | 6/2005 | Fein et al. |
| 2006/0114903 A1 | 6/2006 | Duffy et al. |
| 2006/0120288 A1 | 6/2006 | Vasseur et al. |
| 2006/0155801 A1 | 7/2006 | Brabson |
| 2007/0211735 A1 | 9/2007 | Williamson |
| 2008/0175240 A1 | 7/2008 | Suzuki |
| 2009/0003214 A1 | 1/2009 | Vaswani et al. |
| 2009/0103468 A1 | 4/2009 | Kasapidis |
| 2010/0054245 A1 | 3/2010 | Asati et al. |
| 2010/0103856 A1 | 4/2010 | Kim et al. |
| 2010/0118781 A1 | 5/2010 | Petrovic et al. |
| 2010/0208742 A1 | 8/2010 | Kafle et al. |
| 2010/0303072 A1 | 12/2010 | Jokela et al. |
| 2011/0002301 A1 | 1/2011 | Chan et al. |
| 2011/0013557 A1 | 1/2011 | Westberg et al. |
| 2011/0228770 A1 | 9/2011 | Dholakia et al. |
| 2011/0286450 A1 | 11/2011 | Wijnands |
| 2012/0180122 A1 | 7/2012 | Yan et al. |
| 2012/0202502 A1 | 8/2012 | Wu |
| 2012/0257598 A1* | 10/2012 | Karampatsis ......... H04W 8/082 370/331 |
| 2012/0320876 A1* | 12/2012 | Zhou ............ H04L 61/103 370/331 |
| 2013/0188638 A1 | 7/2013 | Venaas et al. |
| 2013/0215772 A1 | 8/2013 | Kaur et al. |
| 2013/0294396 A1* | 11/2013 | Iwamura ............ H04W 72/04 370/329 |
| 2014/0112139 A1 | 4/2014 | Allan et al. |
| 2014/0115135 A1* | 4/2014 | Allan ............ H04L 67/1004 709/223 |
| 2014/0189160 A1* | 7/2014 | Haddad ............ H04L 61/251 709/245 |
| 2014/0198706 A1 | 7/2014 | Jo et al. |
| 2014/0226642 A1* | 8/2014 | Haddad ............ H04L 12/2898 370/338 |
| 2014/0254591 A1 | 9/2014 | Mahadevan et al. |
| 2014/0269412 A1 | 9/2014 | Venaas et al. |
| 2014/0297875 A1 | 10/2014 | Cheng et al. |
| 2014/0317249 A1 | 10/2014 | Janakiraman et al. |
| 2014/0362854 A1 | 12/2014 | Yu et al. |
| 2015/0074741 A1 | 3/2015 | Subramanian et al. |
| 2015/0085640 A1 | 3/2015 | Song |
| 2015/0138961 A1 | 5/2015 | Wijnands et al. |
| 2015/0156660 A1 | 6/2015 | Luo |
| 2015/0181473 A1* | 6/2015 | Horn ............ H04W 72/048 370/331 |
| 2015/0236954 A1 | 8/2015 | Cheng et al. |
| 2015/0365885 A1 | 12/2015 | Yang et al. |
| 2016/0065531 A1 | 3/2016 | Xiaopu et al. |
| 2016/0072823 A1* | 3/2016 | Faccin ............ H04M 15/00 726/1 |
| 2016/0095019 A1* | 3/2016 | Cui ............ H04W 36/0011 370/331 |
| 2016/0119159 A1 | 4/2016 | Zhao et al. |
| 2016/0127459 A1 | 5/2016 | Qi |
| 2016/0127889 A1 | 5/2016 | Cui et al. |
| 2016/0134526 A1 | 5/2016 | Moreno et al. |
| 2016/0173356 A1 | 6/2016 | Jiang et al. |
| 2016/0183127 A1* | 6/2016 | Xu ............ H04W 28/10 370/235 |
| 2016/0227439 A1* | 8/2016 | Wang ............ H04W 28/085 |
| 2016/0277463 A1 | 9/2016 | Nagarajan et al. |
| 2016/0286441 A1* | 9/2016 | Kweon ............ H04W 36/0066 |
| 2017/0026417 A1 | 1/2017 | Ermagan et al. |
| 2017/0068453 A1 | 3/2017 | Wijnands et al. |
| 2017/0093689 A1 | 3/2017 | Manur et al. |
| 2017/0118787 A1* | 4/2017 | Kekki ............ H04L 69/163 |
| 2017/0222920 A1 | 8/2017 | Thubert et al. |
| 2017/0289855 A1 | 10/2017 | Xu et al. |
| 2017/0317841 A1 | 11/2017 | Xu |
| 2017/0325055 A1* | 11/2017 | Enomoto ............ H04W 76/22 |
| 2017/0332420 A1* | 11/2017 | Cui ............ H04W 76/11 |
| 2017/0339623 A1 | 11/2017 | Pillay-Esnault |
| 2017/0373962 A1* | 12/2017 | Keeley ............ H04W 24/06 |
| 2018/0007604 A1 | 1/2018 | Pillay-Esnault |
| 2018/0167311 A1 | 6/2018 | Hasani et al. |
| 2018/0241671 A1 | 8/2018 | Bosch et al. |
| 2018/0242395 A1* | 8/2018 | Selvaganapathy .. H04W 88/182 |
| 2018/0278521 A1 | 9/2018 | Townsley et al. |
| 2018/0278522 A1 | 9/2018 | Asati et al. |
| 2018/0279397 A1 | 9/2018 | Faccin et al. |
| 2019/0028933 A1* | 1/2019 | Kawasaki ............ H04W 76/27 |
| 2019/0075497 A1 | 3/2019 | Zhu et al. |
| 2019/0150225 A1* | 5/2019 | Mohamed ......... H04W 28/0263 370/329 |
| 2019/0274076 A1* | 9/2019 | Kim ............ H04W 36/0058 |
| 2019/0306758 A1 | 10/2019 | Ma et al. |
| 2020/0245206 A1 | 7/2020 | Allan |

FOREIGN PATENT DOCUMENTS

| | | |
|---|---|---|
| WO | 2015/120902 A1 | 8/2015 |
| WO | 2017/180335 A1 | 10/2017 |
| WO | 2018/006017 A1 | 1/2018 |
| WO | 2018/138544 A1 | 8/2018 |
| WO | 2018/138545 A1 | 8/2018 |
| WO | 2018/162947 A1 | 9/2018 |
| WO | 2018/183740 A1 | 10/2018 |
| WO | 2018/207006 A1 | 11/2018 |
| WO | 2020/084335 A1 | 4/2020 |
| WO | 2020/096594 A1 | 5/2020 |

OTHER PUBLICATIONS

Atkinson, et al., "ILNP Architectural Description; draft-irtf-rrg-ilnp-arch-06.txt," IETF Trust, Internet Draft, Jul. 10, 2012, pp. 1-53.

Atkinson, et al., "IPv6 Nonce Destination Option for ILNPv6; draft-irtf-rrg-ilnp-noncev6-06.txt," IETF Trust, Internet Draft, Jul. 10, 2012, pp. 1-14.

Atkinson, et al., "Optional Advanced Deployment Scenarios for ILNP; draft-irtf-rrg-ilnp-adv-00.txt," Internet Draft, IETF Trust, Jan. 12, 2012, pp. 1-25.

Bogineni, et al., "Optimized Mobile User Plane Solutions for 5G; draft-bogineni-dmm-optimized-mobile-user-plane-00.txt," Internet-Draft, IETF Trust, Mar. 5, 2018, pp. 1-39.

Cabellos, et al., "An Architectural Introduction to the Locator/ID Separation Protocol (LISP); draft-ietf-lisp-introduction-13.txt," Internet Engineering Task Force, IETF Trust, Network Working Group, Internet-Draft, Apr. 2, 2015, pp. 1-27.

Cabellos, et al., "LISPmob: Mobile Networking through LISP," Dec. 14, 2011, retrieved from http://www.openoverlayrouter.org/lispmob/sites/default/files/users/user1/documents/LISPmob_Whitepaper.pdf on May 9, 2017, pp. 1-8.

(56) References Cited

OTHER PUBLICATIONS

Farinacci, et al., "LISP for the Mobile Network; draft-farinacci-lisp-mobile-network-04.txt," Internet Engineering Task Force, IETF Trust, Network Working Group, Internet-Draft, Sep. 11, 2018, pp. 1-24.

Fuller, et al., "LISP Delegated Database Tree, draft-ietf-lisp-ddt-08," IETF Trust, Network Working Group, Internet-Draft, Sep. 8, 2016, pp. 1-37.

Gohar, et al., "A Seamless Handover Scheme in LISP Networks," 2013 International Conference on ICT Convergence (ICTC), IEEE, Oct. 14, 2013, pp. 1-4.

Hu, et al., "ID/Locator Distributed Mapping Server; draft-hu-lisp-dht-00.txt," Internet Engineering Task Force, Internet-Draft, Oct. 18, 2009, pp. 1-11.

Kurebayashi, et al., "Evolving 5G Routing," Sep. 21, 2017, pp. 1-17.

Moreno, et al., "Signal-Free LISP Multicast; draft-ietf-lisp-signal-free-multicast-01," Internet Engineering Task Force, IETF Trust, Network Working Group, Internet-Draft, Apr. 21, 2016, pp. 1-19.

Mueller, et al., "Mobility Management for 5G Network Architectures using Identifier-Locator Addressing; draft-mueller-ila-mobility-01.txt," Internet Engineering Task Force, IETF, Oct. 3, 2016, pp. 1-21.

RFC 6329: Fedyk, et al., "IS-IS Extensions Supporting IEEE 802.1aq Shortest Path Bridging," Internet Engineering Task Force (IETF), Request for Comments: 6329, Apr. 2012, pp. 1-38.

RFC 6740: Atkinson, et al., "Identifier-Locator Network Protocol (ILNP) Architectural Description," IETF Trust, Internet Research Task Force, Request for Comments: 6740, Nov. 10, 2012, pp. 1-53.

RFC 6741: Atkinson, et al., "Identifier-Locator Network Protocol (ILNP) Engineering Considerations," Internet Engineering Task Force, IETF Trust, Internet Research Task Force (IRTF), Request for Comments: 6741, Nov. 2012, pp. 1-38.

RFC 6742: Atkinson, et al., "DNS Resource Records for the Identifier-Locator Network Protocol (ILNP)," Internet Engineering Task Force, IETF Trust, Internet Research Task Force (IRTF), Request for Comments: 6742, Nov. 2012, pp. 1-20.

RFC 6743: Atkinson, et al., "ICMP Locator Update Message for the Identifier-Locator Network Protocol for IPv6 ILNPv6)," Internet Engineering Task Force, IETF Trust, Internet Research Task Force (IRTF), Request for Comments: 6743, Nov. 2012, pp. 1-12.

RFC 6744: Atkinson, et al., "IPv6 Nonce Destination Option for the Identifier-Locator Network Protocol for IPv6 ILNPv6)," Internet Engineering Task Force, IETF Trust, Internet Research Task Force (IRTF), Request for Comments: 6744, Nov. 2012, pp. 1-14.

RFC 6748: Atkinson, et al., "Optional Advanced Deployment Scenarios for the Identifier-Locator Network Protocol ILNP)," Internet Engineering Task Force, IETF Trust, Internet Research Task Force (IRTF), Request for Comments: 6748, Nov. 2012, pp. 1-37.

RFC 6831: Farinacci, et al., "The Locator/ID Separation Protocol (LISP) for Multicast Environments," Internet Engineering Task Force (IETF), Request for Comments: 6831, Jan. 2013, pp. 1-28.

Rui, T., "Network Access Control Mechanism Based on Locator/Identifier Split," International Conference on Networking, Architecture, and Storage (NAS 2009), IEEE, Jul. 9, 2009, pp. 171-174.

Wijnands, et al., "Multicast using Bit Index Explicit Replication; draft-ietf-bier-architecture-04," Internet Engineering Task Force (IETF), Internet-Draft, Jul. 18, 2016, pp. 1-36.

Wijnands, et al., "Multicast using Bit Index Explicit Replication; draft-wijnands-bier-architecture-05," Internet Engineering Task Force, Internet-Draft, Mar. 6, 2015, pp. 1-30.

\* cited by examiner

Handover between eNodeBs that have ILNP breakout capability

Handover from eNodeB that has ILNP breakout capability to eNodeB that does not have ILNP breakout capability Handover from eNodeB that does not have ILNP breakout capability to eNodeB that has ILNP breakout capability Handover between eNodeBs that do not have ILNP breakout capability

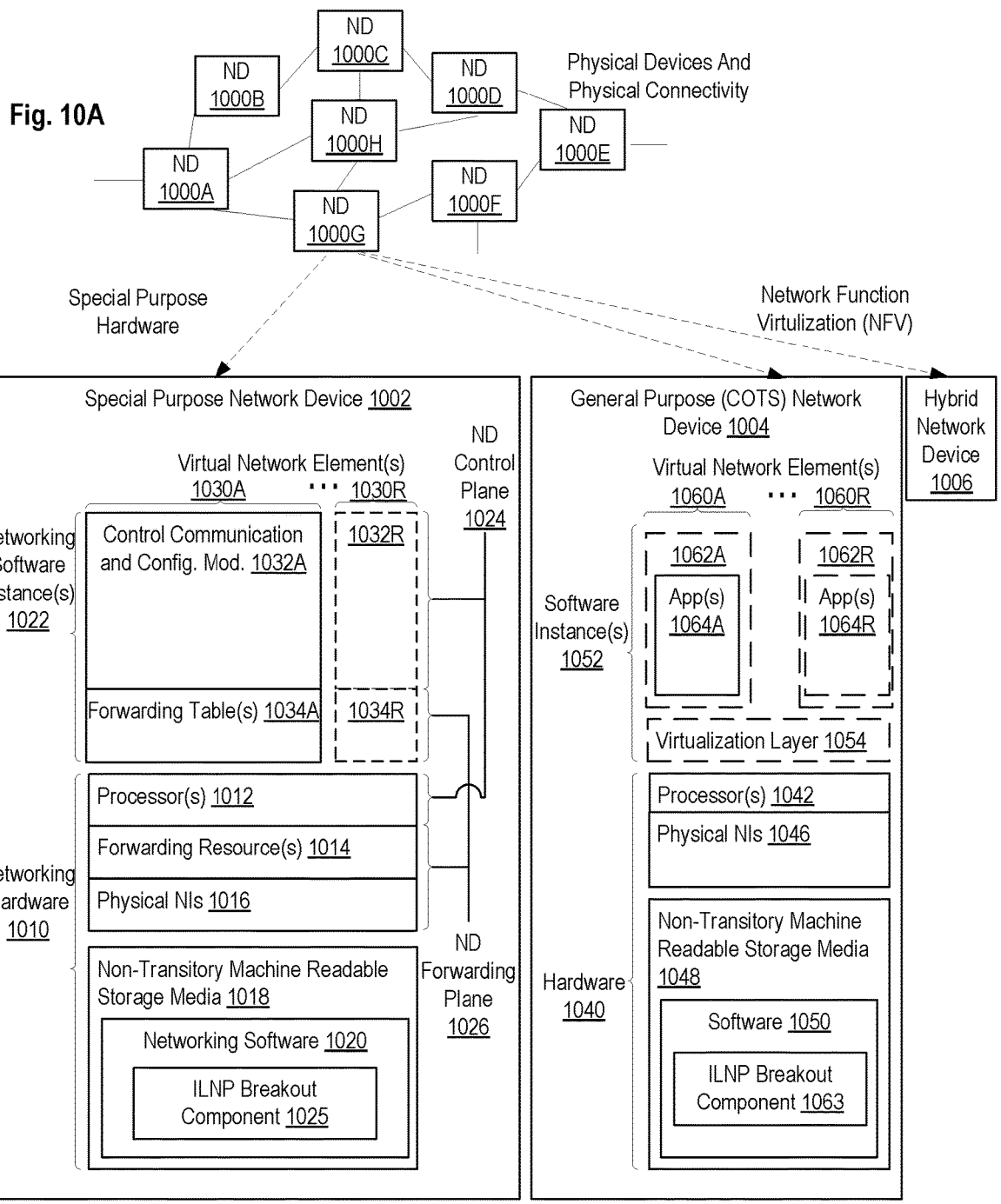

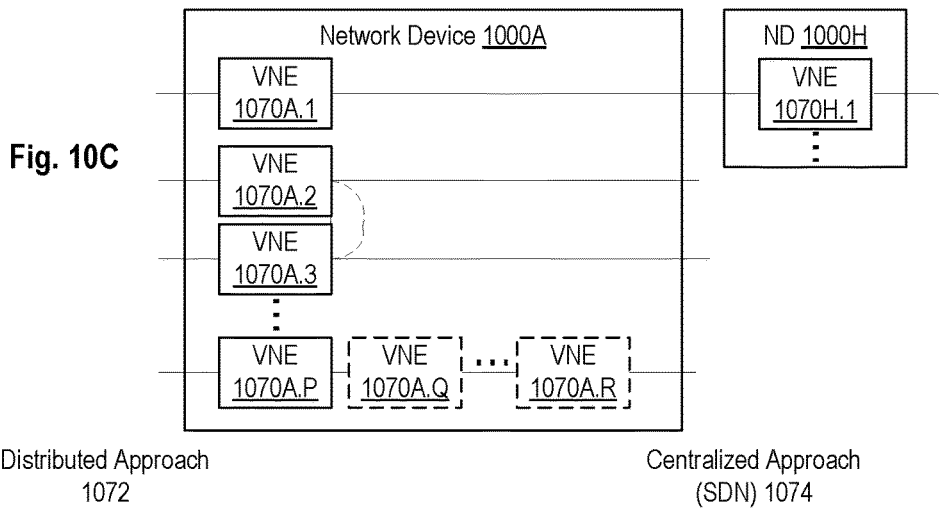
Fig. 10C
Fig. 10D
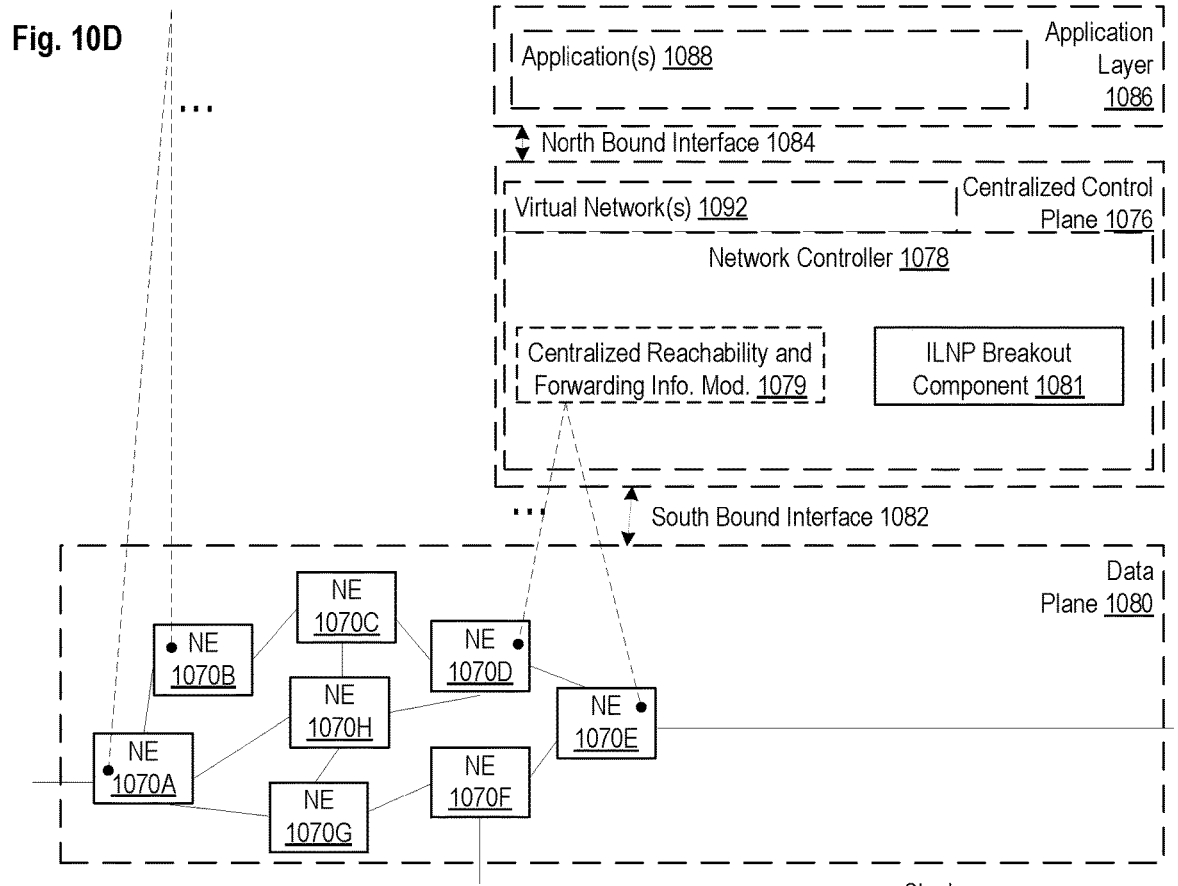
Fig. 10E
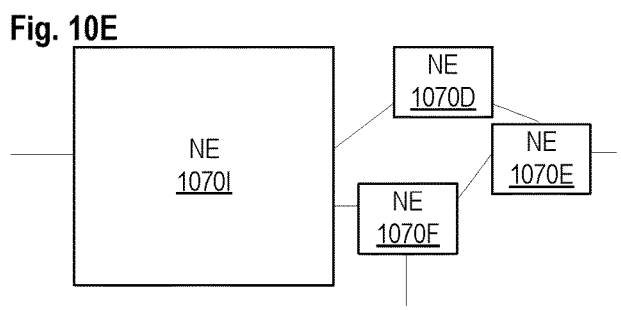
Fig. 10F
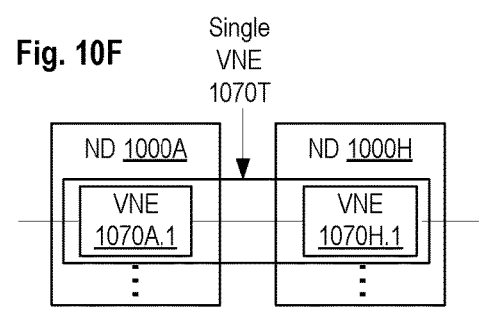

LOCAL IDENTIFIER LOCATOR NETWORK PROTOCOL (ILNP) BREAKOUT

CROSS-REFERENCE TO RELATED APPLICATIONS

This application is a national stage of International Application No. PCT/IB2017/052827, filed May 12, 2017, which is hereby incorporated by reference.

TECHNICAL FIELD

Embodiments of the invention relate to the field of $3^{rd}$ generation partnership project (3GPP) networks; and more specifically, to using ILNP to enable a distributed gateway architecture.

BACKGROUND

Cellular communication networks enable a user equipment (UE) 101, such as cellular phones and similar computing devices, to communicate using spread spectrum radio frequency communication. As shown in FIG. 1, the UE 101 communicates directly with a radio access network (RAN). The RAN includes a set of base stations such as evolved universal terrestrial radio access network (E-UTRAN) nodes, referred to as E-UTRAN node B or eNodeB 103. FIG. 1 is a diagram of an example architecture for a cellular communication network consistent with 3GPP standardized cellular communication architecture including an exemplary UE 101 communicating with an eNodeB 103 of the network. The eNodeB 103 interfaces with a packet core network or evolved packet core (EPC) 115 that connects the UE 101 to a packet data network (PDN) via which UE 101 can communicate with other devices in the cellular communication network and with devices external to the cellular communication network.

The EPC 115 and its components are responsible for enabling communication between the UE 101 and other devices both internal and external to the cellular communication network. The EPC 115 includes a serving gateway (S-GW) 105, a packet gateway (P-GW) 107, a mobility management entity (MME) 109 and similar components. Additional components are part of the EPC 115 (e.g., home subscriber server (HSS) 111), but the components with less relevance to the handling of UE 101 and its mobility have been excluded for clarity and to simplify the representation. The UE 101 may change the eNodeB 103 through which it communicates with the network as it moves about geographically. The MME 109, S-GW 105 and P-GW 107 coordinate to facilitate this mobility of the UE 101 without interruption to any ongoing telecommunication session of the UE 101.

The MME 109 is a control node that, among other duties, is responsible for determining an S-GW 105 that the UE 101 is to communicate with at attach time and when handovers between eNodeBs 103 in the RAN occur. The MME 109 has other responsibilities including idle mode communication with UE 101, which includes paging and text retransmissions.

The S-GW 105 and P-GW 107 provide anchor points for the UE 101 that facilitate the mobility of the UE 101 without the UE 101 losing connections with other devices. The S-GW 105 routes and forwards data to and from the UE 101 while functioning as a mobility anchor point for UE 101 handovers between eNodeBs 103. The P-GW 107 provides connectivity between the UE 101 and external PDNs by being a fixed anchor point that offers the UE's 101 Internet Protocol (IP) address into a routable PDN. The S-GW 105 and P-GW 107 may belong to a common operator or different operators, depending on whether the UE 101 is currently being served by a home or visited network.

As shown in the example simplified network of FIG. 1, the UE 101 communicates with the EPC 115 via the eNodeB 103 and reaches a correspondent 117A or 117B via P-GW 107. In this example, the traffic from the UE 101 traverses the connected eNodeB 103, the S-GW 105, and P-GW 107, to reach a correspondent node (CN) 117. If the CN 117 is a mobile device, the path to that CN may also traverse a P-GW, S-GW and eNodeB which are also subtended to the common PDN. The CNs 117 can be any device capable of receiving the traffic from the UE 101 and sending traffic to the UE 101 including cellular phones, computing devices and similar devices that may be connected through any number of intermediate networking or computing devices.

A mobile carrier will typically deploy a very small number of P-GW sites nationally, hence these gateways are often located at a significant distance from a RAN and its constituent components such as the eNodeBs 103. Yet, traffic from a UE 101 must traverse the S-GW 105 and/or P-GW 107 before reaching a CN 117, which if it is another mobile terminal may only be reached by the P-GW and S-GW serving the CN 117. The traffic to the S-GW 105 and P-GW 107 is tunneled to these devices and due to their distant location, bandwidth and latency inefficiencies are introduced into the cellular communication network.

SUMMARY

A method is implemented by a network device functioning as a source evolved universal terrestrial radio access network (E-UTRAN) node B (eNodeB) in a cellular communication network to support incremental deployment of identifier locator network protocol (ILNP) breakout in the cellular communication network. The method includes advertising a first access point name (APN) and a second APN to a user equipment (UE), where the first APN is associated with a user plane packet gateway (P-GWu) that is implemented at the source eNodeB, and where the second APN is associated with a packet gateway (P-GW) in a core of the cellular communication network, establishing a first PDN session associated with the first APN, establishing a second PDN session associated with the second APN, receiving, from the UE via the first PDN session, a first packet destined for a first Correspondent Node (CN), forwarding the first packet to the first CN via the P-GWu implemented at the source eNodeB, receiving, from the UE via the second PDN session, a second packet destined for a second CN, and forwarding the second packet to the second CN via the P-GW in the core of the cellular communication network.

A method is implemented by a user equipment (UE) in a cellular communication network to support incremental deployment of identifier locator network protocol (ILNP) breakout in the cellular communication network. The method includes receiving an advertisement for a first access point name (APN) and a second APN from a source evolved universal terrestrial radio access network (E-UTRAN) node B (eNodeB), where the first APN is associated with a user plane packet gateway (P-GWu) that is implemented at the source eNodeB, and where the second APN is associated with a packet gateway (P-GW) in a core of the cellular communication network, establishing a first PDN session associated with the first APN, establishing a second PDN session associated with the second APN, sending traffic destined for a first Correspondent Node (CN) that is ILNP capable via the first PDN session, and sending traffic destined for a second CN that is not ILNP capable via the second PDN session.

A network device is configured to function as a source evolved universal terrestrial radio access network (E-UTRAN) node B (eNodeB) in a cellular communication network that supports incremental deployment of identifier locator network protocol (ILNP) breakout in the cellular communication network. The network device includes a set of one or more processors and a non-transitory computer-readable medium having stored therein an ILNP breakout component. The ILNP breakout component, when executed by the set of one or more processors, causes the network device to advertise a first access point name (APN) and a second APN to a user equipment (UE), where the first APN is associated with a user plane packet gateway (P-GWu) that is implemented at the source eNodeB, and where the second APN is associated with a packet gateway (P-GW) in a core of the cellular communication network, establish a first PDN session associated with the first APN, establish a second PDN session associated with the second APN, receive, from the UE via the first PDN session, a first packet destined for a first Correspondent Node (CN), forward the first packet to the first CN via the P-GWu implemented at the source eNodeB, receive, from the UE via the second PDN session, a second packet destined for a second CN, and forward the second packet to the second CN via the P-GW in the core of the cellular communication network.

A user equipment (UE) is configured to operate in a cellular communication network that supports incremental deployment of identifier locator network protocol (ILNP) breakout in the cellular communication network. The UE includes a set of one or more processors and a non-transitory computer-readable medium having stored therein an ILNP breakout component. The ILNP breakout component, when executed by the set of one or more processors, causes the UE to receive an advertisement for a first access point name (APN) and a second APN from a source evolved universal terrestrial radio access network (E-UTRAN) node B (eNodeB), where the first APN is associated with a user plane packet gateway (P-GWu) that is implemented at the source eNodeB, and where the second APN is associated with a packet gateway (P-GW) in a core of the cellular communication network, establish a first PDN session associated with the first APN, establish a second PDN session associated with the second APN, send traffic destined for a first Correspondent Node (CN) that is ILNP capable via the first PDN session, and send traffic destined for a second CN that is not ILNP capable via the second PDN session.

BRIEF DESCRIPTION OF THE DRAWINGS

The invention may best be understood by referring to the following description and accompanying drawings that are used to illustrate embodiments of the invention. In the drawings:

FIG. 10A illustrates connectivity between network devices (NDs) within an exemplary network, as well as three exemplary implementations of the NDs, according to some embodiments.

FIG. 10B illustrates an exemplary way to implement a special-purpose network device according to some embodiments.

FIG. 10C illustrates various exemplary ways in which virtual network elements (VNEs) may be coupled according to some embodiments.

FIG. 10D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 10E illustrates the simple case of where each of the NDs implements a single NE, but a centralized control plane has abstracted multiple of the NEs in different NDs into (to represent) a single NE in one of the virtual network(s), according to some embodiments.

FIG. 10F illustrates a case where multiple VNEs are implemented on different NDs and are coupled to each other, and where a centralized control plane has abstracted these multiple VNEs such that they appear as a single VNE within one of the virtual networks, according to some embodiments.

DETAILED DESCRIPTION

Figure 1:
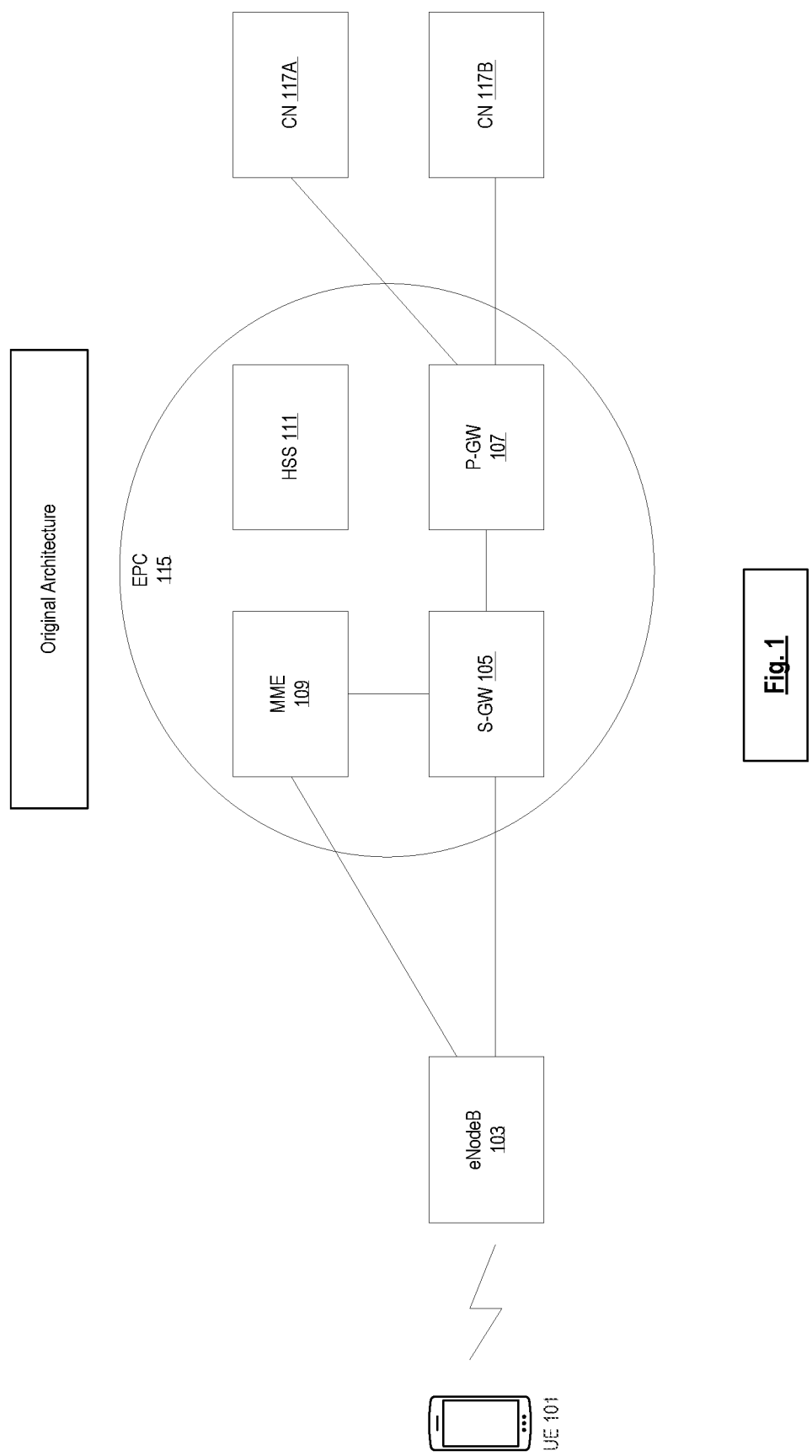
FIG. 1 is a diagram of an example architecture for a cellular communication network consistent with 3GPP standardized cellular communication architecture.

The following description sets forth methods and system for incrementally deploying identifier locator network protocol (ILNP) breakout in a cellular communication network such as a 3$^{rd}$ generation partnership project (3GPP) architecture network. ILNP breakout uses ILNP to enable a distributed gateway architecture to improve efficiency in a 3GPP network by eliminating inefficiency related to the use of anchor points. The 3GPP architecture and the geographic placement of its components is driven by both technical and business considerations and requires specific functionalities and functional distributions to be carried forward in any update to the architecture. Embodiments provide improved efficiency while preserving the key functionalities of the 3GPP architecture.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The 3GPP architecture enables user equipment (UE) mobility by hiding the true location of a UE from a correspondent node (CN) by tunneling traffic to the UE via fixed anchor points (e.g., serving gateway (S-GW) and packet gateway (P-GW)) in the cellular communication network. However, the use of fixed anchor points may introduce inefficiencies in the cellular communication network. A mobile carrier typically deploys a small number of P-GW sites nationally, hence these gateways are often located at a significant distance from a radio access network (RAN) and its constituent components such as the evolved universal terrestrial radio access network (E-UTRAN) nodes, referred to as E-UTRAN node B or simply as eNodeB. Traffic from a UE must be tunneled through the S-GW and/or P-GW before reaching a correspondent node (CN), even if the CN is located in the same network as the UE (e.g., a home network scenario), which can introduce bandwidth and latency inefficiencies in the cellular communication network.

The S-GW and P-GW in the 3GPP architecture implement specific functionalities not easily dispensed with as they address business and regulatory requirements. Embodiments avoid some of the inefficiencies introduced by the use of fixed anchor points in the 3GPP architecture by splitting the user plane functions of each gateway from the control plane functions and distributing the user plane functions to the eNodeBs. This can be done without changing key aspects of the 3GPP architecture if the control plane functions remain in the centralized or invariant location. Distributing the user plane functions to the eNodeBs enables much of the traffic to avoid being tunneled to the potentially distant S-GW and/or P-GW. As used herein, the terms "user plane functions" and "data plane functions" are interchangeable. The user plane functions of the S-GW and the P-GW are referred to herein as the S-GWu and P-GWu functions, respectively. The control plane functions of the S-GW and the P-GW are referred to herein as the S-GWc and P-GWc functions, respectively. An S-GW may be implemented as an S-GWc function that controls a constellation of distributed S-GWus. Likewise, a P-GW may be implemented as a P-GWc function that controls a constellation of distributed P-GWus. The centralized S-GWc and P-GWc facilitate interworking with the existing 3GPP deployments while hiding the distributed nature of the user plane functions.

Embodiments disclosed herein use ILNP to enable the distribution of the user plane functions that allows traffic to be broken out locally without having to go through potentially distant anchor points (this ability to break out traffic locally using ILNP may generally be referred to herein as "ILNP breakout"). ILNP is a network protocol that changes the semantics of an Internet Protocol (IP) address to have two distinct namespaces. The first namespace is referred to as an identifier and the second namespace is referred to as a locator. The identifier is a non-topological name for uniquely identifying a node. The locator is a topologically bound name for an Internet Protocol (IP) subnetwork. By separating identifier and locator, a device can change locations within a network without the identity of the device changing and therefore associated session state (e.g. transmission control protocol (TCP) or IP security (IPSEC)) remains valid independent of the device's point of attachment to the network. The change in semantics of the IP address is transparent to the network layer so routers in the network would forward IP packets and ILNP packets in the same manner.

For a UE and a CN to communicate using ILNP, both the UE and the CN need to implement ILNP. An entity (e.g., UE or CN) that implements ILNP may be referred to herein as being ILNP capable. An entity that does not implement ILNP may be referred to herein as being non-ILNP capable. A UE cannot use ILNP for mobility if the CN is not ILNP capable. Also, eNodeBs need to be ILNP aware to enable seamless handover. However, it is foreseen that at least initially, not all UEs and CNs will be ILNP capable and not all eNodeBs will be ILNP aware. Thus, there is a need to incrementally deploy ILNP breakout in a cellular communication network.

Embodiments disclosed herein enable incremental deployment of ILNP breakout in a cellular communications network by providing an ILNP capable UE with two access point names (APNs). The first APN is associated with a PGW-u that is implemented at an eNodeB and provides ILNP breakout capability. The second APN is associated with a P-GW in a core of a cellular communication network (e.g., evolved packet core (EPC)) and does not provide ILNP breakout capability. The UE may establish a first packet data network (PDN) session associated with the first APN and a second PDN session associated with the second APN. When the UE communicates with an ILNP capable CN, the UE forwards traffic to the CN via the first PDN session (so that traffic goes through the P-GWu implemented at the eNodeB for ILNP breakout). However, when the UE communicates with a non-ILNP capable CN, the UE forwards traffic to the CN via the second PDN session (so that traffic goes through the P-GW in the core of the cellular communication network, as done in traditional 3GPP). Providing two different APNs allows for incremental deployment of ILNP breakout within the existing 3GPP infrastructure. Also, embodiments disclosed herein integrate ILNP into the handover procedures to allow ILNP capable UEs to be handed over seamlessly between eNodeBs. Other embodiments are also described and claimed.

Figure 2:
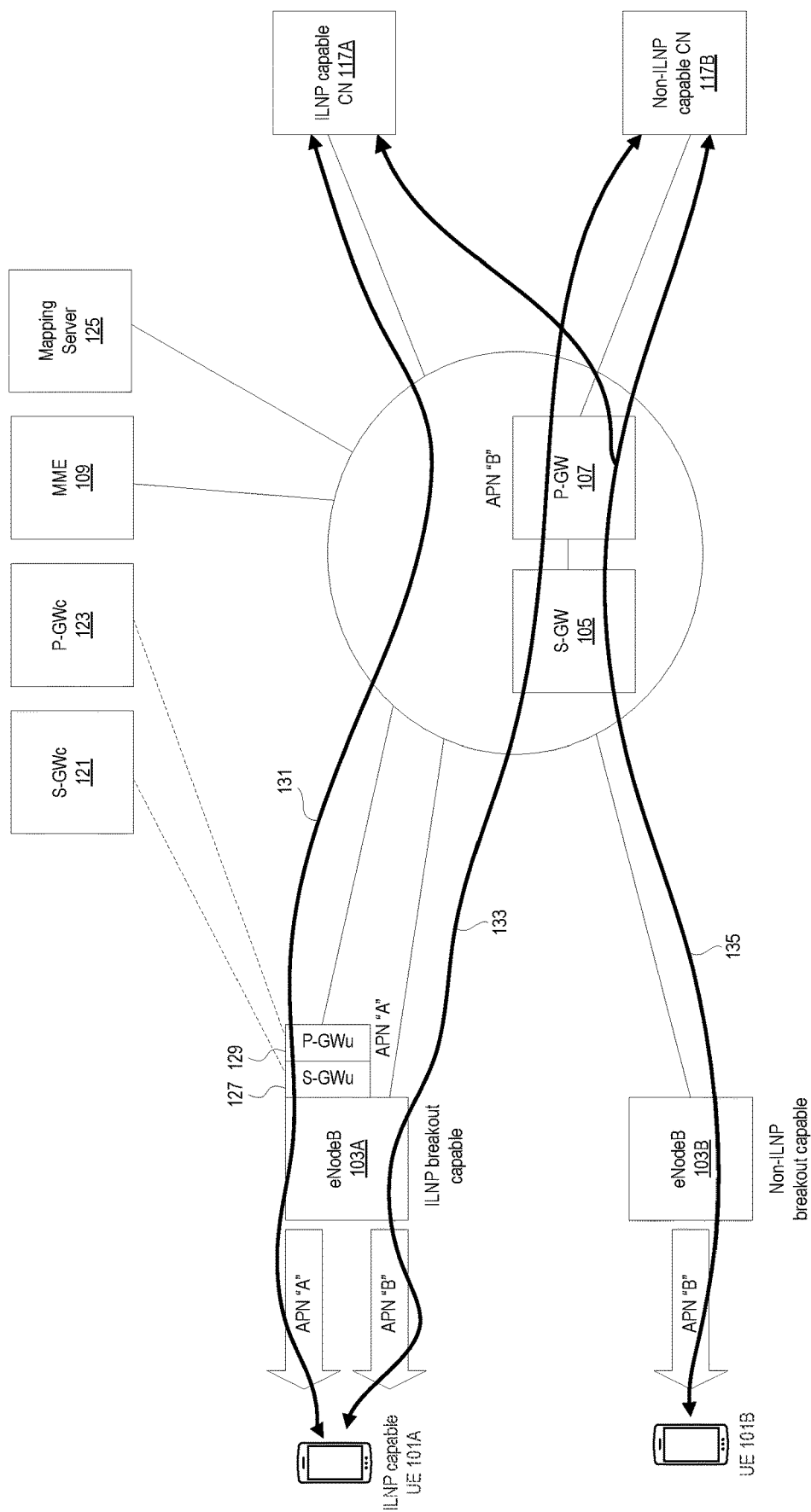
FIG. 2 is a diagram of a 3GPP architecture with distributed S-GWs and P-GWs that enables incremental deployment of ILNP breakout, according to some embodiments.

FIG. 2 is a diagram of a 3GPP architecture with distributed S-GWs and P-GWs that enables incremental deployment of ILNP breakout, according to some embodiments. The exemplary network architecture shown in the diagram enables the UEs 101A, B to communicate with the CNs 117A, B. The network architecture includes an ILNP capable UE 101A that is connected to eNodeB 103A. The eNodeB 103A has ILNP breakout capability and thus implements an S-GWu 127 and a P-GWu 129. The S-GWu 127 and the P-GWu 129 may apply policies, implement quality of service (QoS), perform regulatory functions (e.g., legal intercept), and perform other user plane functions typically performed by S-GWs and P-GWs in a traditional 3GPP architecture. The S-GWu 127 is controlled by an S-GWc 121 and the P-GWu 129 is controlled by a P-GWc 123. The centralized S-GWc 121 and the P-GWc 123 may respectively control one or several corresponding instances of S-GWus 127 and P-GWus 129 distributed at the eNodeBs 103. This enables the S-GWc 121 and the P-GWc 123 to control the user plane instances while preserving the external appearance and interfaces of a single monolithic gateway. The network architecture also includes a UE 101B that is connected to eNodeB 103B, which does not have ILNP breakout capability. UE 101B may or may not be ILNP capable. For purposes of simplicity and clarity, the network architecture is shown as including a single ILNP breakout capable eNodeB 103A and a single non-ILNP breakout capable eNodeB 103B. It should be understood, however, that the network architecture can include additional eNodeBs 103.

The network architecture also includes traditional 3GPP entities such as a mobility management entity (MME) 109, an S-GW 105, and a P-GW 107. These entities perform the same functions as performed in traditional 3GPP architectures. The network architecture also includes a mapping server 125 that stores identifiers and locators for nodes (which the UE 101 or other entity can use to look up the identifier and locator for a particular node). In one embodiment, the mapping server 125 is a domain name system (DNS) server (e.g., for general Internet access) or an internet protocol multimedia subsystem (IMS) server (e.g., for telephony).

As shown in the diagram, the UE 101A is provided with two APNs: APN A and APN B. APN A is associated with a P-GWu 129 and provides ILNP breakout capability (APN A is an ILNP APN). APN B is associated with a P-GW 107 and does not provide ILNP breakout capability (it provides network access through anchor points S-GW 105 and P-GW 107 so APN B is a non-ILNP APN). In one embodiment, the eNodeB 103A advertises APN A and APN B to the UE 101A during network attach. In one embodiment, the APN that provides ILNP breakout capability has a well-known name or format that allows the UE 101A to know that the APN provides IPLN breakout capability (e.g., internet-ilnp.ericsson). The UE 101A may establish a first PDN session that is associated with APN A and a second PDN session that is associated with APN B. The UE 101A may be provided with a locator to use for communicating via the first PDN session. Also, the UE 101A may be provided with either a prefix or Internet Protocol version 6 (IPv6) address to use for communicating via the second PDN session. The UE 101 may select a different PDN session to use when communicating with a CN 117 depending on whether the CN 117 is ILNP capable. For example, the UE 101A may communicate with ILNP capable CN 117A using the first PDN session, which directs traffic over datapath 131 that goes through S-GWu 127 and P-GWu 129. However, UE 101A may communicate with non-ILNP capable CN 117B using the second PDN session, which directs traffic over datapath 133 that goes through anchor points S-GW 105 and P-GW 107. A UE 101 may determine whether a CN 117 is ILNP capable based on looking up the CN 117 in the mapping server 125 or based on an indication in a packet received from the CN 117 that the CN 117 is ILNP capable (e.g., in a header of the packet). In this way, the UE 101A takes advantage of ILNP breakout capabilities when communicating with an ILNP capable CN 117A but uses traditional network access mechanisms (via anchor points) when communicating with a non-ILNP capable CN 117B, which allows for the incremental deployment of ILNP breakout.

In contrast to UE 101A, UE 101B is attached to the eNodeB 103B that does not have ILNP breakout capability. Thus, UE 101B is only provided with APN B (and not APN A) and may establish a PDN session associated with APN B. The UE 101B communicates with ILNP capable CN 117A and non-ILNP capable CN 117B using this PDN session, which directs traffic over datapath 135 that goes through anchor points S-GW 105 and P-GW 107. It should be noted that if UE 101B is ILNP capable, then it may still communicate with ILNP capable CN using ILNP so that the ILNP capable CN can use ILNP breakout even though UE 101B is not able to take advantage of ILNP breakout (since it is connected to an eNodeB 103B that does not have ILNP breakout capability).

In order to initiate an ILNP communication session with a CN 117, a UE 101 or other end system needs to know whether the CN 117 is ILNP capable. In one embodiment, the UE 101 consults with the mapping server 125 to determine whether a CN 117 is ILNP capable. For example, the mapping server may be a DNS server and the UE 101 may retrieve a DNS record corresponding to the CN 117 to determine whether the CN 117 is ILNP capable. In mobile broadband, DNS is not the only mechanism used to resolve peers (e.g., there is Session Initiation Protocol (SIP) exchange based on telephony identifiers). For purposes of this disclosure, it is assumed that at the time the UE 101 desires to initiate communication with a CN 117, it has a mechanism to know whether the CN 117 is ILNP capable (e.g., by consulting mapping server or via telephony signaling). It should be noted that whether the CN is ILNP capable is independent of whether ILNP breakout is available.

A UE 101 (e.g., UE 101A) that has established multiple PDN sessions effectively has multiple bearers in 3GPP terms. For functionally equivalent connectivity to both the ILNP breakout PDN session and the traditional PDN session, the Service Data Flow (SDF) templates for both may be the same. Also, the MME 109 may need to know the location of the UE 101 for tracking and paging purposes. Thus, in one embodiment, the UE 101 registers with the MME 109.

In a cellular communication network, a UE 101 may change the eNodeB 103 to which it connects as it moves about geographically. The process of switching between eNodeBs 103 is generally referred to as a handover process. During incremental deployment of ILNP breakout, the cellular communication network may include eNodeBs 103 that have ILNP breakout capability as well as eNodeBs 103 that do not have ILNP breakout capability. Thus, the UE 101 may be handed over between eNodeBs that have ILNP breakout capability, between eNodeBs that do not have ILNP breakout capability, and between an eNodeB that has ILNP breakout capability and an eNodeB that does not have ILNP breakout capability, and vice versa. Existing X2 assisted handover may not be applicable or may need to be modified to support seamless handover for these various scenarios without losing session continuity. The handover process for these various scenarios are shown in FIGS. 3A-D and described herein below.

Figure 3A:
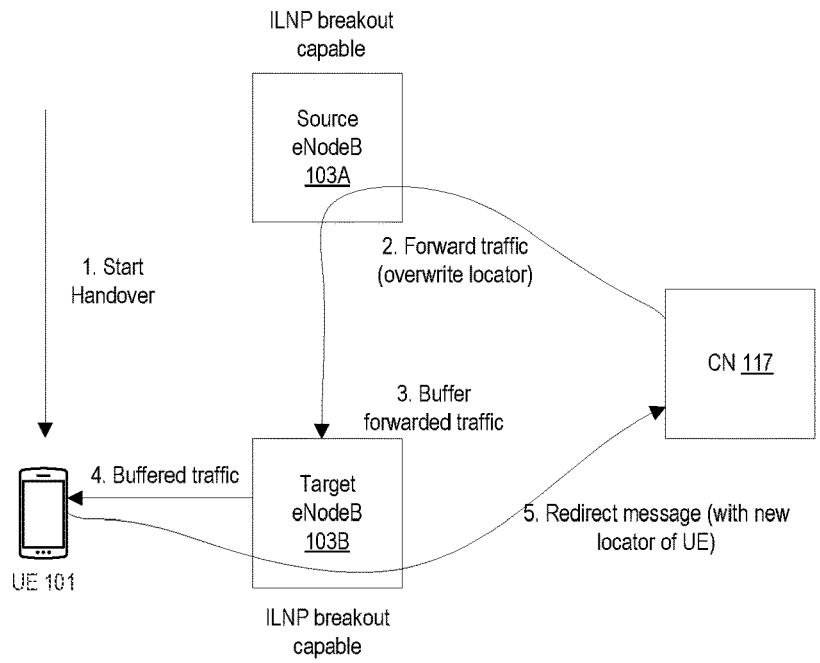
FIG. 3A is a diagram illustrating operations of a handover process when a UE is handed over between eNodeBs that have ILNP breakout capability, according to some embodiments.

FIG. 3A is a diagram illustrating operations of a handover process when a UE is handed over between eNodeBs that have ILNP breakout capability, according to some embodiments. At operation 1, the UE 101 triggers the handover process when it moves from the source eNodeB 103A toward the target eNodeB 103B, where both the source eNodeB 103A and the target eNodeB have ILNP breakout capability. As a result, the UE 101 disconnects from the source eNodeB 103A and starts connecting to the target eNodeB 103B. Even after the UE 101 disconnects from the source eNodeB 103A, the CN 117 continues to send traffic for the UE 101 to the source eNodeB 103A (since it may not yet know that the UE 101 has moved). At operation 2, the source eNodeB 103A forwards traffic for the UE 101 to the target eNodeB 103B by overwriting the locator (e.g., in the header of a packet) with a locator associated with the target eNodeB 103B. At operation 3, the target eNodeB 103B buffers the forwarded traffic. At operation 4, the target eNodeB 103B sends the buffered traffic to the UE 101. At operation 5, the UE 101 sends a redirect message (e.g., Internet Control Message Protocol (ICMP) redirect message) to the CN 117 that indicates that UE 101 can be reached using its new locator (which may be the same as the locator associated with the target eNodeB 103B that was used to overwrite the locator at operation 2, depending on implementation).

Figure 3B:
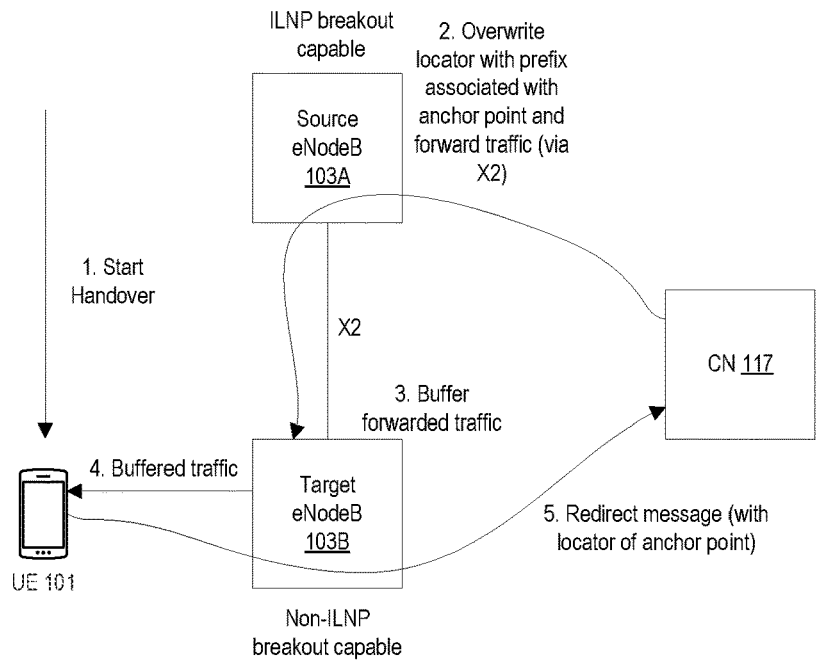
FIG. 3B is a diagram illustrating operations of a handover process when a UE is handed over from an eNodeB that has ILNP breakout capability to an eNodeB that does not have ILNP breakout capability, according to some embodiments.

FIG. 3B is a diagram illustrating operations of a handover process when a UE is handed over from an eNodeB that has ILNP breakout capability to an eNodeB that does not have ILNP breakout capability, according to some embodiments. At operation 1, the UE 101 triggers the handover process when it moves from the source eNodeB 103A toward the target eNodeB 103B, where the source eNodeB 103A has ILNP breakout capability but the target eNodeB does not have ILNP breakout capability. As a result, the UE 101 disconnects from the source eNodeB 103A and starts connecting to the target eNodeB 103B. Even after the UE 101 disconnects from the source eNodeB 103A, the CN 117 continues to send traffic for the UE 101 to the source eNodeB 103A (since it may not yet know that the UE 101 has moved). At operation 2, the source eNodeB 103A overwrites the locator with the prefix associated with an anchor point (e.g., P-GW 107) and forwards the traffic over an X2 tunnel, which effectively causes the ILNP traffic to be treated as if it were non-ILNP traffic. At operation 3, the target eNodeB 103B buffers the forwarded traffic. At operation 4, the target eNodeB 103B sends the buffered traffic to the UE 101. At operation 5, the UE 101 sends a redirect message (e.g., ICMP Redirect message) to the CN 117 that indicates that the UE 101 can be reached using the locator associated with the anchor point (e.g., PG-W 107 in the core of the cellular communication network).

Figure 3C:
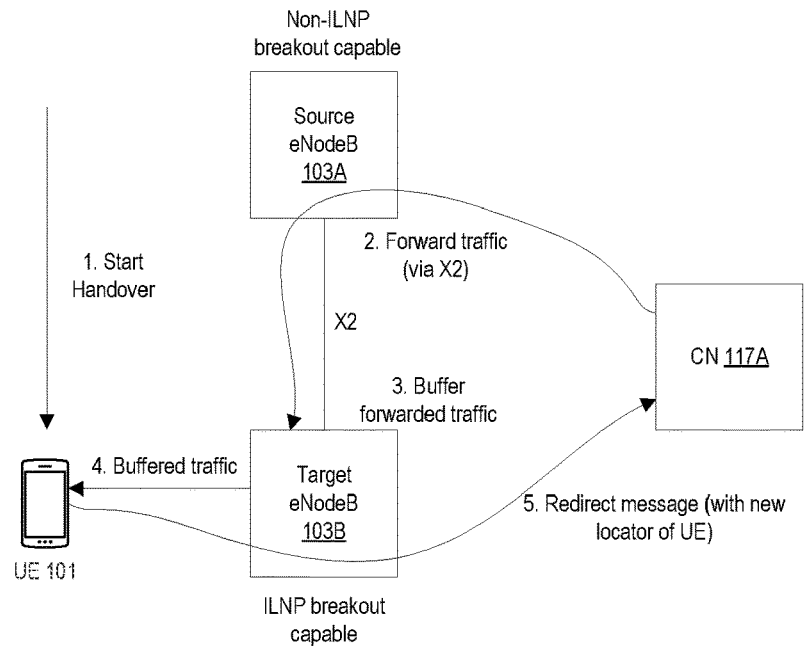
FIG. 3C is a diagram illustrating operations of a handover process when a UE is handed over from an eNodeB that does not have ILNP breakout capability to an eNodeB that has ILNP breakout capability, according to some embodiments.

FIG. 3C is a diagram illustrating operations of a handover process when a UE is handed over from an eNodeB that does not have ILNP breakout capability to an eNodeB that has ILNP breakout capability, according to some embodiments. At operation 1, the UE 101 triggers the handover process when it moves from the source eNodeB 103A toward the target eNodeB 103B, where the source eNodeB 103A does not have ILNP breakout capability and the target eNodeB 103B has ILNP breakout capability. As a result, the UE 101 disconnects from the source eNodeB 103A and starts connecting to the target eNodeB 103B. Even after the UE 101 disconnects from the source eNodeB 103A, the CN 117 continues to send traffic for the UE 101 to the source eNodeB 103A (since it may not yet know that the UE 101 has moved). At operation 2, the source eNodeB 103A forwards traffic for the UE 101 to the target eNodeB 103B over an X2 tunnel. At operation 3, the target eNodeB 103B buffers the forwarded traffic. At operation 4, the target eNodeB 103B sends the buffered traffic to the UE 101. At operation 5, the UE 101 sends a redirect message (e.g., ICMP Redirect message) to the CN 117 that indicates that the UE 101 can be reached using its new locator.

Figure 3D:
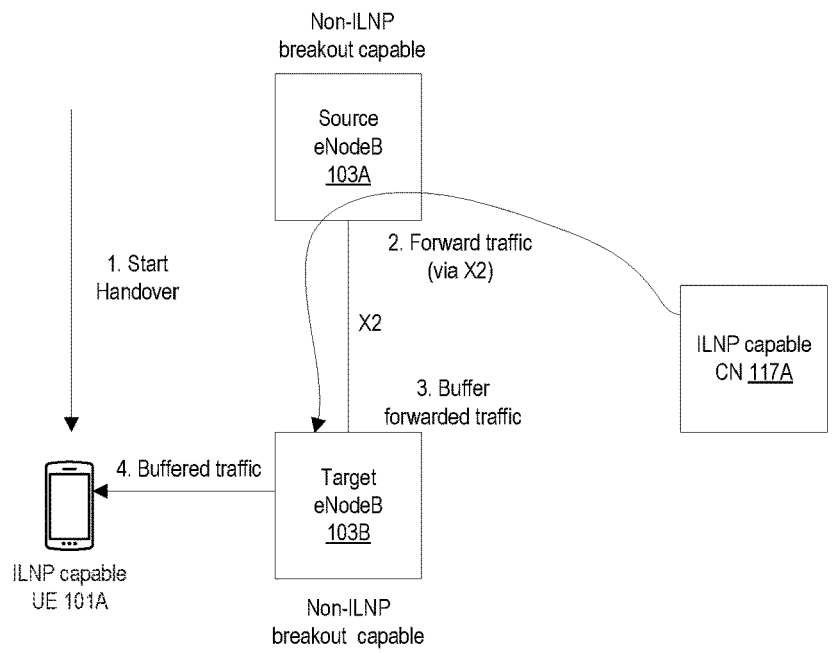
FIG. 3D is a diagram illustrating operations of a handover process when a UE is handed over between eNodeBs that do not have ILNP breakout capability, according to some embodiments.

FIG. 3D is a diagram illustrating operations of a handover process when a UE is handed over between eNodeBs that do not have ILNP breakout capability, according to some embodiments. The operations of this handover process remain the same as the X2 assisted handover process employed in traditional 3GPP architectures. At operation 1, the UE 101 triggers the handover process when it moves from the source eNodeB 103A toward the target eNodeB 103B, where both the source eNodeB 103A and the target eNodeB do not have ILNP breakout capability. As a result, the UE 101 disconnects from the source eNodeB 103A and starts connecting to the target eNodeB 103B. Even after the UE 101 disconnects from the source eNodeB 103A, the CN 117 continues to send traffic for the UE 101 to the source eNodeB 103A (since it may not yet know that the UE 101 has moved). At operation 2, the source eNodeB 103A forwards traffic for the UE 101 to the target eNodeB 103B over an X2 tunnel. At operation 3, the target eNodeB 103B buffers the forwarded traffic. At operation 4, the target eNodeB 103B sends the buffered traffic to the UE 101. It should be noted that in this scenario, the locator for the UE 101 does not change and thus the UE 101 does not need to send a redirect message to the CN 117 (even if it is communicating with the CN 117 using ILNP).

Figure 4:
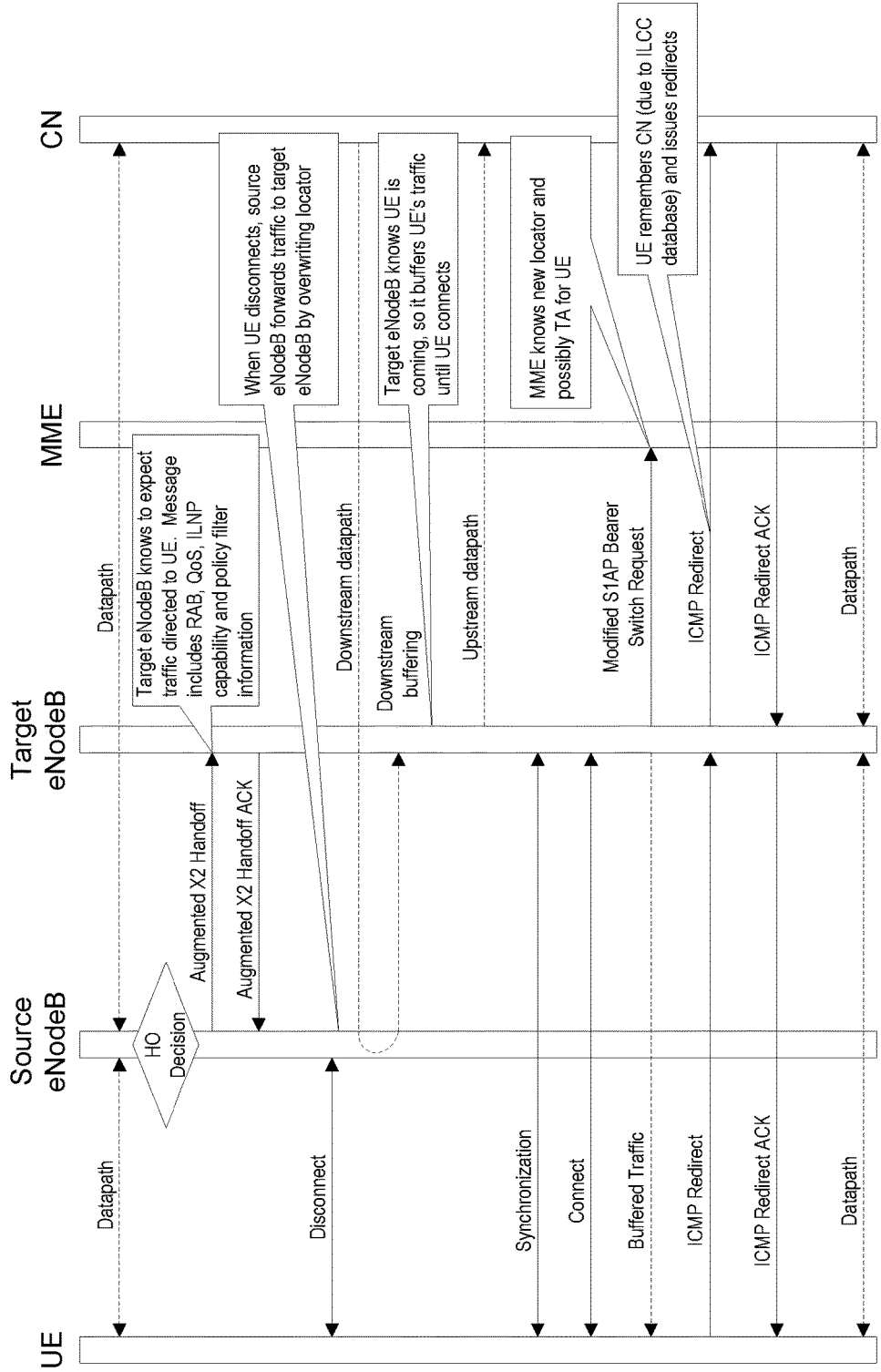
FIG. 4 is a diagram of a handover call flow, according to some embodiments.

FIG. 4 is a diagram of a handover call flow, according to some embodiments. The call flow primarily illustrates the entities and calls involved in the ILNP handover. Thus, other entities and calls related to the overall handover process may not be illustrated for sake of clarity. As is common and well understood practice, transactions may be acknowledged, and if a transaction initiator does not receive an acknowledgement in a specified time interval, the transaction initiator can retry the transaction. This can repeat for a specified number of times before the operation is considered to have failed.

UE 101 is initially connected to source eNodeB 103A and communicates with CN 117 over a datapath that goes through source eNodeB 103A. Subsequently, source eNodeB 103A determines that the UE 101 is to be handed over to the target eNodeB 103B (i.e., the source eNodeB 103A makes a handover decision). In response to determining that the UE 101 is to be handed over to the target eNodeB 103B, the source eNodeB 103A sends an augmented X2 Handoff message to the target eNodeB 103B. Based on receiving the augmented X2 Handoff message, the target eNodeB 103B may know to expect traffic destined for the UE 101. The augmented X2 Handoff message may include information regarding radio access bearer (RAB), quality of service (QoS), ILNP breakout capability, and policy filters (e.g., downstream SDF filter). The target eNodeB 103B responds to the augmented X2 Handoff message by sending an augmented X2 Handoff Acknowledgement (ACK) message to the source eNodeB 103A. The UE 101 then disconnects from the source eNodeB 103A. After the UE 101 has disconnected from the source eNodeB 103A, the CN 117 continues to send traffic destined for the UE 101 to the source eNodeB 103A over the downstream datapath (since it may not yet know that the UE 101 has moved). The source eNodeB 103A forwards this traffic to the target eNodeB 103B by overwriting the locator (e.g., in a packet header). The target eNodeB 103B knows that the UE 101 is coming so it buffers the forwarded traffic until the UE 101 connects. At this point, the target eNodeB 103B may have an upstream datapath to the CN 117. Subsequently, the UE 101 synchronizes and connects to the target eNodeB 103B. Once the UE 101 connects to the target eNodeB 103B, the target eNodeB 103B sends the buffered traffic to the UE 101. Also, the target eNodeB 103B sends a modified S1AP Bearer Switch Request message to the MME 109. This message lets the MME 109 know the new locator of the UE 101 (and possibly the tracking area (TA) for the UE 101). The UE 101 then sends an ICMP Redirect message to the CN 117 that indicates that the UE 101 can now be reached via target eNodeB 103B. The UE 101 may have remembered the CN 117 it was communicating with based on information stored in the UE's 101 Identifier Locator Communication Cache (ILCC) (ILCC is an ILNP construct that tracks the set of CNs 117, their IDs, session nonces, and other relevant state (e.g., timers for redirect ACKs)). The CN 117 responds by sending an ICMP Redirect ACK message to the UE 101. The UE 101 can then communicate with the CN 117 over a datapath that goes through the target eNodeB 103B and handover is complete.

It is also possible to envision other scenarios that have mobility implications without a handoff having occurred. For example, this would be when a UE 101 goes idle and changes locations while idle. In this scenario, it would be possible that an eNodeB 103 received a packet directed to a UE 101 not connected to the network. In this scenario, the eNodeB 103 may buffer the packet and request the MME 109 for a location to forward the packet to. If the UE 101 is still idle, the MME 109 may initiate paging procedures to wake up the UE 101, and advise the eNodeB 103 of the resulting location of the UE 101. If the new location was not local to the eNodeB 103, the eNodeB 103 may perform prefix modification on the buffered packet, and then forward it to the appropriate eNodeB 103 for delivery to the UE 101.

It is possible to also consider various race conditions such that packets are relayed to a UE 101 by the network on the basis of stale information combined with either handoff or paging procedures. The nature of the forwarding mechanism is such that the fact that the packet was sent via a stale locator is hidden from the UE 101. For existing CNs 117, the normal ILNP procedures of sending an ICMP Redirect message will address the locator freshness issue. As a part of this embodiment, UEs 101 may send an ICMP Redirect message to all new CNs 117 to ensure that the CNs have fresh locator information in their respective ILCCs.

Figure 5:
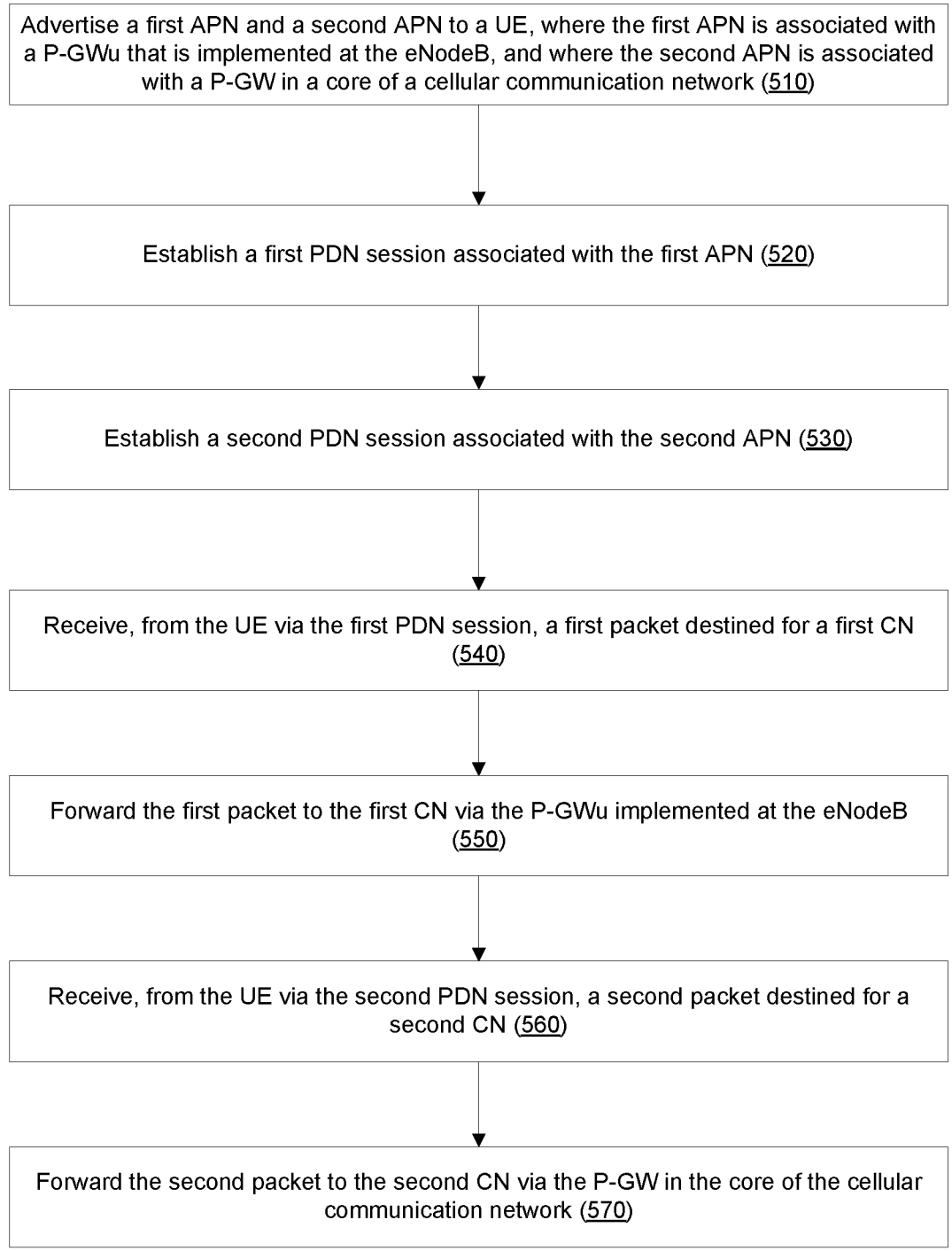
FIG. 5 is a flow diagram of a process performed by an eNodeB to support incremental deployment of ILNP breakout, according to some embodiments.

FIG. 5 is a flow diagram of a process performed by an eNodeB to support incremental deployment of ILNP breakout, according to some embodiments. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 510, the eNodeB 103 advertises a first APN and a second APN to a UE 101, where the first APN is associated with a P-GWu 129 that is implemented at the eNodeB 103, and where the second APN is associated with a P-GW 107 in a core of a cellular communication network. At block 520, the eNodeB 103 establishes a first PDN session associated with the first APN. At block 530, the eNodeB 103 establishes a second PDN session associated with the second APN. At block 540, the eNodeB 103 receives, from the UE 101 via the first PDN session, a first packet destined for a first CN 117A (the first CN 117A may be a CN 117 that the UE 101 determined is ILNP capable). At block 550, the eNodeB 103 forwards the first packet to the first CN 117A via the P-GWu 129 implemented at the eNodeB 103. At block 560, the eNodeB 103 receives, from the UE 101 via the second PDN session, a second packet destined for a second CN 117B (the second CN 117B may be a CN 117 that the UE 101 determined is not ILNP capable). At block 570, the eNodeB 103 forwards the second packet to the second CN 117B via the P-GW 107 in the core of the cellular communication network.

In one embodiment, the eNodeB 103 receives a third packet destined for a second UE 101 that is not local to the eNodeB 103 (e.g., not connected to the eNodeB 103). In this case, the eNodeB 103 may query an MME 109 for a locator of the second UE 101. The eNodeB 103 may then receive a reply from the MME 109 indicating the locator of the second UE 101 (e.g., MME 109 may determine the locator of the second UE 101 based on performing paging procedures). The eNodeB 103 may then overwrite a destination locator in a header of the third packet with the locator received from the MME 109 and forward the third packet.

Figure 6:
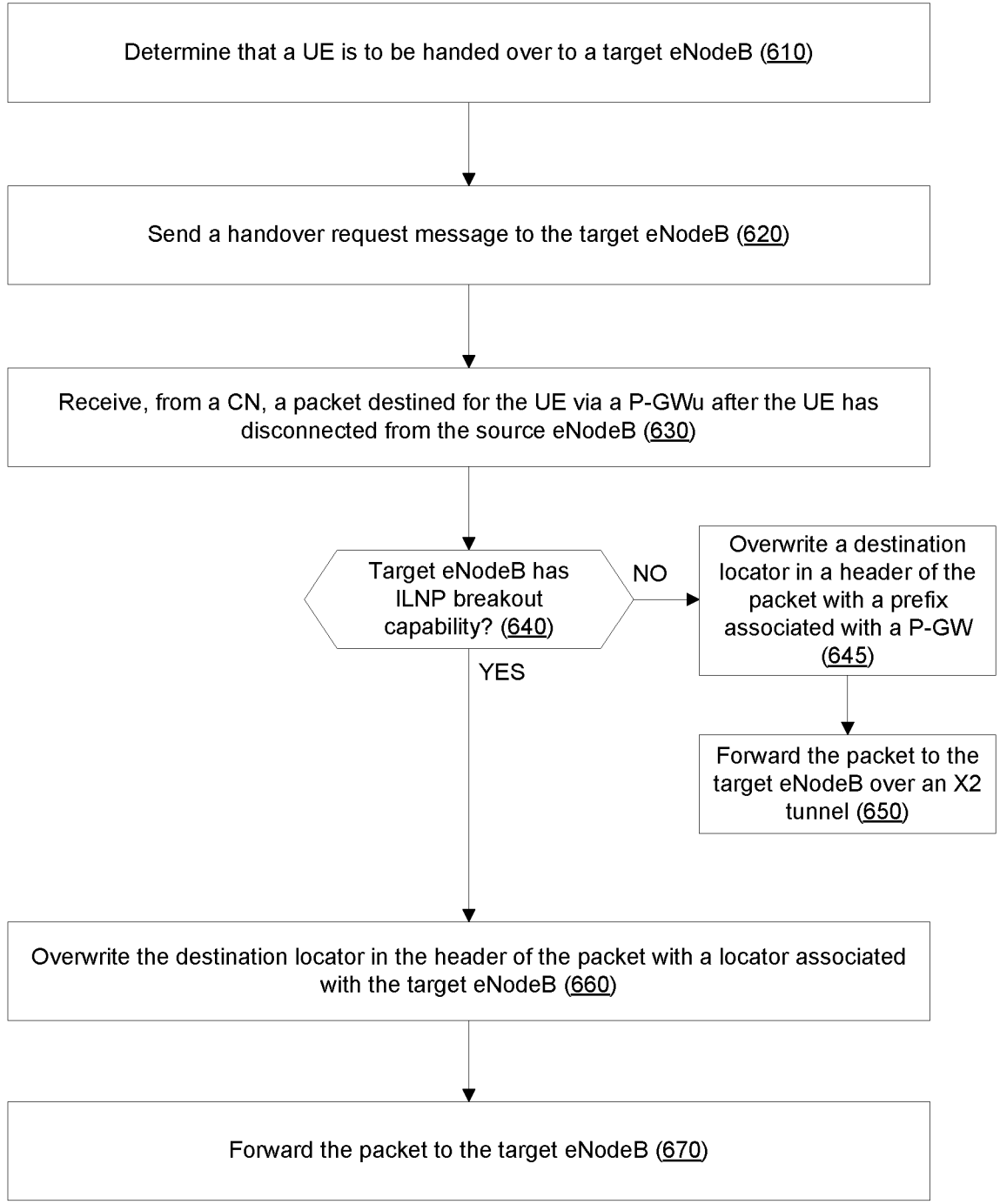
FIG. 6 is a flow diagram of a handover process performed by a source eNodeB, according to some embodiments.

FIG. 6 is a flow diagram of a handover process performed by a source eNodeB, according to some embodiments. At block 610, the source eNodeB 103A determines that a UE 101 is to be handed over to a target eNodeB 103B. At block 620, the source eNodeB 103A sends a handover request message (e.g., an augmented X2 Handoff message) to the target eNodeB 103B (which indicates that UE 101 is to be handed over to the target eNodeB 103B). The handover request message may include information regarding radio access bearer (RAB), quality of service (QoS), ILNP breakout capability, and policy filters (e.g., downstream SDF filter). The source eNodeB 103A may receive a handover request acknowledgement message (e.g., an augmented X2 Handoff ACK message) from the target eNodeB 103B if the target eNodeB 103B successfully receives the handover request message. At block 630, the source eNodeB 103A receives, from a CN 117, a packet destined for the UE 101 via a P-GWu 129 after the UE 101 has disconnected from the source eNodeB 103A. At decision block 640, the source eNodeB 103A determines whether the target eNodeB 103B has ILNP breakout capability. In one embodiment, the source eNodeB 103A determines whether the target eNodeB 103B has ILNP breakout capability based on information included in the handover request acknowledgement message. If the target eNodeB 103B does not have ILNP breakout capability, then at block 645, the source eNodeB 103A overwrites a destination locator in a header of the packet with a prefix associated with a P-GW 107. At block 650, the source eNodeB 103A forwards the packet to the target eNodeB 103B over an X2 tunnel (e.g., General Packet Radio Service (GPRS) Tunneling Protocol (GTP) tunnel) (e.g., X2 tunnel associated with the second PDN session). Returning to decision block 640, if the target eNodeB 103B has ILNP breakout capability, then at block 660, the source eNodeB 103A overwrites the destination locator in the header of the packet with a locator associated with the target eNodeB 103B. At block 670, the source eNodeB 103A forwards the packet to the target eNodeB 103B.

Figure 7:
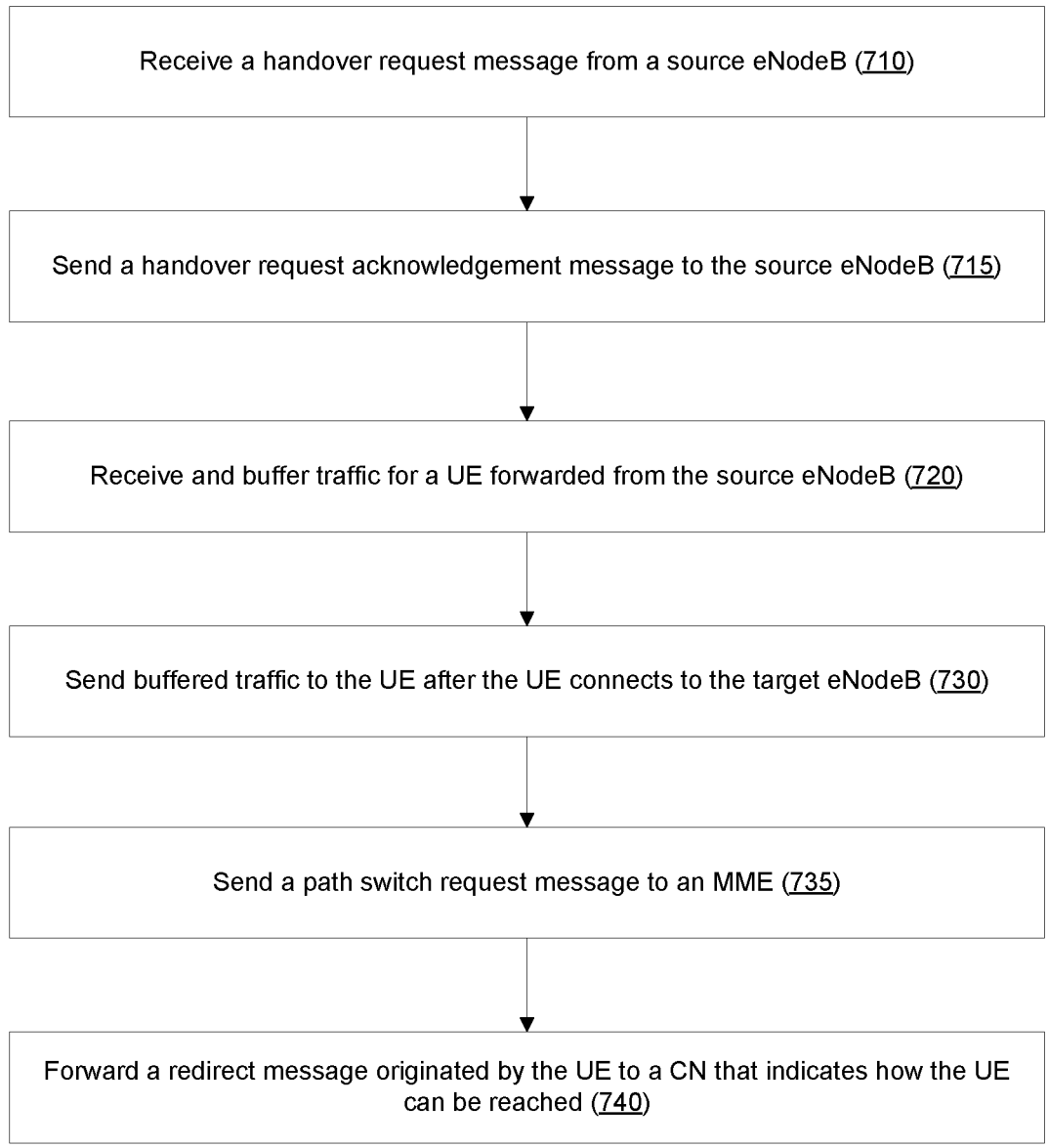
FIG. 7 is a flow diagram of a handover process performed by a target eNodeB, according to some embodiments.

FIG. 7 is a flow diagram of a handover process performed by a target eNodeB, according to some embodiments. At block 710, the target eNodeB 103B receives a handover request message (e.g., an augmented X2 Handoff message) from a source eNodeB 103A. In response, at block 715, the target eNodeB 103B sends a handover request acknowledgement message (e.g., an augmented X2 Handoff ACK message) to the source eNodeB 103A. In one embodiment, the handover request acknowledgement message includes information regarding whether the target eNodeB 103B has ILNP breakout capability. At block 720, the target eNodeB 103B receives and buffers traffic for a UE 101 forwarded from the source eNodeB 103A. At block 730, the target eNodeB 103B sends buffered traffic to the UE 101 after the UE 101 connects to the target eNodeB 103B. At block 735, the target eNodeB 103B sends a path switch request message (e.g., a modified S1AP Bearer Switch Request message) to an MME 109. The path switch request message may inform the MME 109 of the new locator of the UE 101 (and possibly the tracking area (TA) for the UE 101). At block 740, the target eNodeB 103B forwards a redirect message originated by the UE 101 to a CN 117 that indicates how the UE 101 can be reached.

Figure 8:
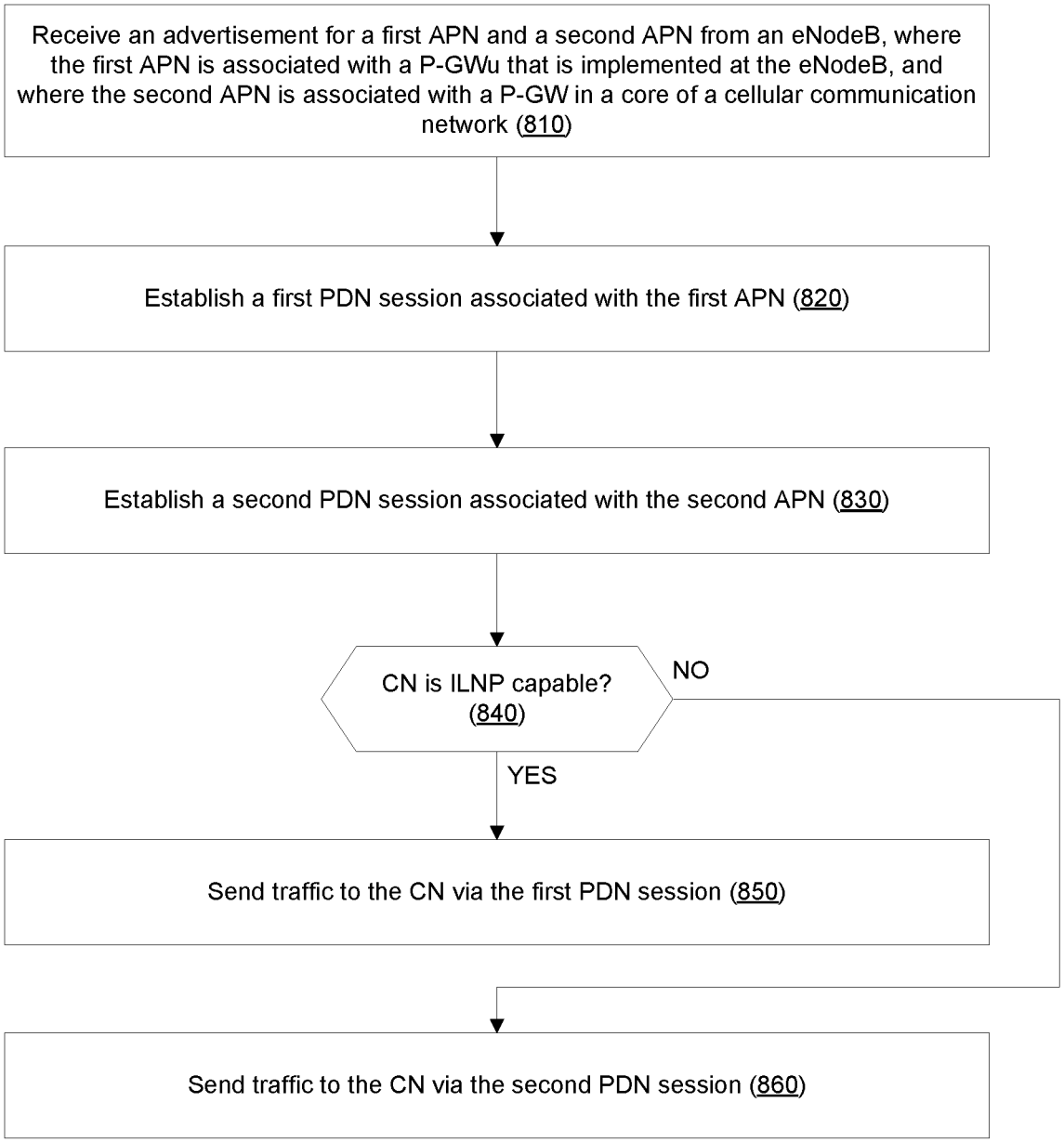
FIG. 8 is a flow diagram of a process performed by a UE to support incremental deployment of ILNP breakout, according to some embodiments.

FIG. 8 is a flow diagram of a process performed by a UE to support incremental deployment of ILNP breakout, according to some embodiments. At block 810, the UE 101 receives an advertisement for a first APN and a second APN from an eNodeB 103, where the first APN is associated with a P-GWu that is implemented at the eNodeB 103, and where the second APN is associated with a P-GW 107 in a core of a communication network. At block 820, the UE 101 establishes a first PDN session associated with the first APN. In one embodiment, the UE 101 is provided with a locator to use for communicating via the first PDN session. At block 830, the UE 101 establishes a second PDN session associated with the second APN. In one embodiment, the UE 101 is provided with either a prefix or IPv6 address to use for communicating via the second PDN session. At decision block 840, the UE 101 determines whether a CN 117 is ILNP capable. In one embodiment, the UE 101 determines whether the CN 117 is ILNP capable based on looking up information about the CN 117 in a mapping server 125 (e.g., DNS server). If the CN 117 is ILNP capable, then at block 850, the UE 101 sends traffic to the CN 117 via the first PDN session. However, if the CN 117 is not ILNP capable, then at block 860, the UE 101 sends traffic to the CN 117 via the second PDN session. In one embodiment, the UE 101 initially attempts to establish ILNP communication with the CN 117 via the second PDN session (associated with the second APN (i.e., non-ILNP APN)). If this succeeds (which indicates that the CN 117 is ILNP capable), the UE 101 may switch to using the first PDN session (associated with the first APN (i.e., ILNP APN) to communicate with the CN 117. In one embodiment, the UE 101 sends, to all CNs 117 that initiate sessions with the UE 101, a redirect message that indicates how the UE 101 can be reached (e.g., to ensure that all CNs 117 have fresh locator information in their respective ILCCs).

Figure 9:
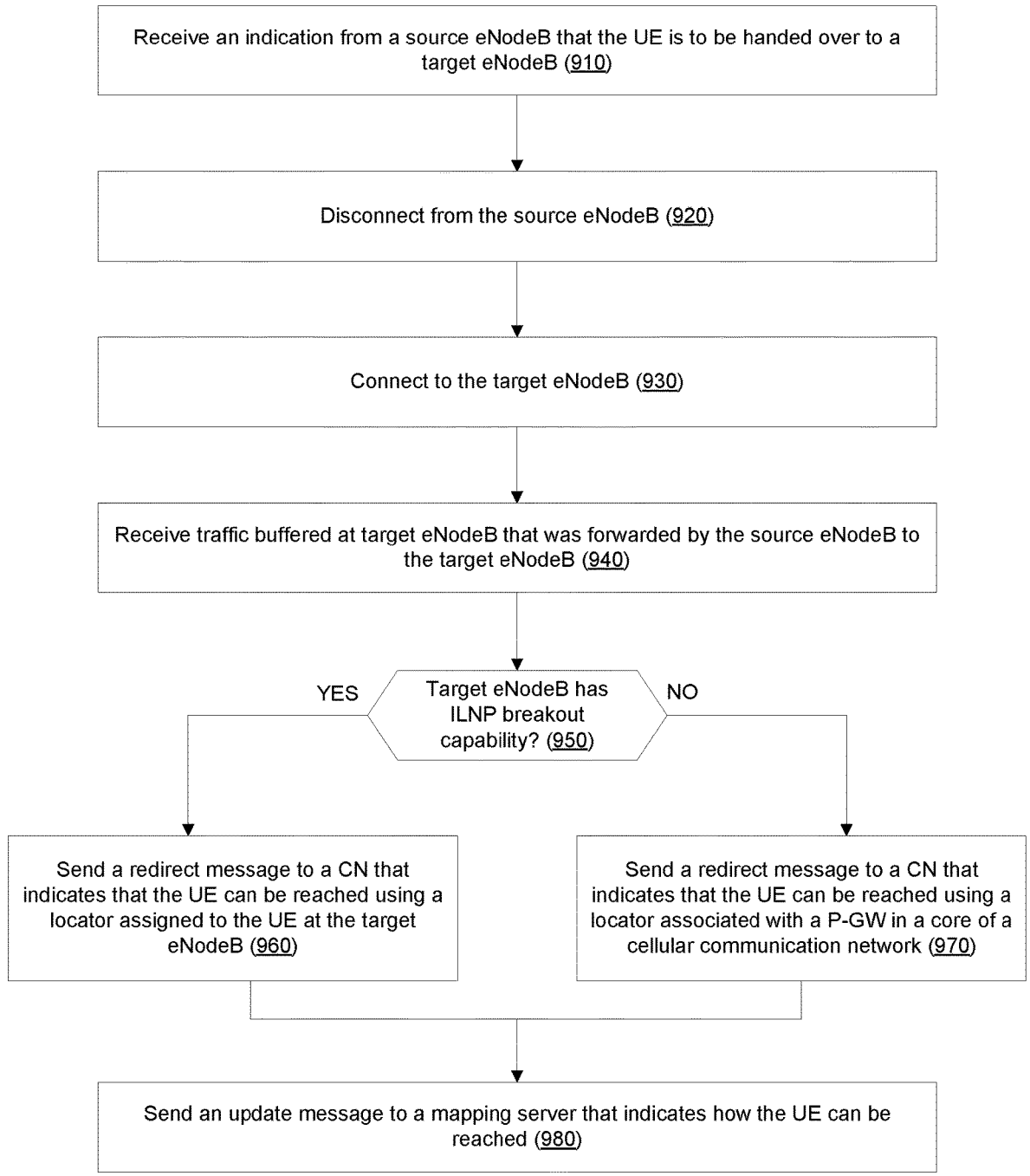
FIG. 9 is a flow diagram of a handover process performed by a UE, according to some embodiments.

FIG. 9 is a flow diagram of a handover process performed by a UE, according to some embodiments. At block 910, the UE 101 receives an indication from a source eNodeB 103A that the UE 101 is to be handed over to a target eNodeB 103B. At block 920, the UE 101 disconnects from the source eNodeB 103A. At block 930, the UE 101 connects to the target eNodeB 103B. In one embodiment, the UE 101 connects to the target eNodeB 103B before disconnecting from the source eNodeB 103A. At block 940, the UE 101 receives traffic buffered at the target eNodeB 103B that was forwarded by the source eNodeB 103A to the target eNodeB 103B. At decision block 950, the UE 101 determines whether the target eNodeB 103B has ILNP breakout capability. In one embodiment, the UE 101 determines whether the target eNodeB 103B has ILNP breakout capability based on receiving an advertisement for an ILNP APN from the target eNodeB 103B (and establishing a PDN session associated with the ILNP APN). If the target eNodeB 103B has ILNP breakout capability, then at block 960, the UE 101 sends a redirect message to a CN 117 that indicates that the UE 101 can be reached using a locator assigned to the UE 101 at the target eNodeB 103B. However, if the target eNodeB 103B does not have ILNP breakout capability, then at block 970, the UE 101 sends a redirect message to a CN 117 that indicates that the UE 101 can be reached using a locator associated with a P-GW 107 in a core of a cellular communication network. In one embodiment, the redirect message is an ICMP Redirect message. At block 980, the UE 101 sends an update message to a mapping server 125 that indicates how the UE 101 can be reached.

An advantage of embodiments disclosed herein is that they enable incremental deployment of ILNP breakout, while preserving key aspects of the business interfaces of the 3GPP architecture. Also, changes to the network are mostly confined to the UE 101, 3GPP architecture components, and the end system stacks in CNs 117. That is, there is no fork lift in the middle of the network to enable the solution. Also, the overhead of tunneling is eliminated or reduced for ILNP capable CNs 117. Also, embodiments disclosed herein allow a mobile carrier to control the pace of transition (e.g., force voice over long term evolution (VoLTE) over the traditional datapath with anchor points).

FIG. 10A illustrates connectivity between network devices (NDs) within an exemplary network, as well as three exemplary implementations of the NDs, according to some embodiments of the invention. FIG. 10A shows NDs 1000A-H, and their connectivity by way of lines between 1000A-1000B, 1000B-1000C, 1000C-1000D, 1000D-1000E, 1000E-1000F, 1000F-1000G, and 1000A-1000G, as well as between 1000H and each of 1000A, 1000C, 1000D, and 1000G. These NDs are physical devices, and the connectivity between these NDs can be wireless or wired (often referred to as a link). An additional line extending from NDs 1000A, 1000E, and 1000F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application—specific integrated—circuits (ASICs) and a special-purpose operating system (OS); and 2) a general purpose network device 1004 that uses common off-the-shelf (COTS) processors and a standard OS.

The special-purpose network device 1002 includes networking hardware 1010 comprising a set of one or more processor(s) 1012, forwarding resource(s) 1014 (which typically include one or more ASICs and/or network processors), and physical network interfaces (NIs) 1016 (through which network connections are made, such as those shown by the connectivity between NDs 1000A-H), as well as non-transitory machine readable storage media 1018 having stored therein networking software 1020. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A).

Software 1020 can include code such as ILNP breakout component 1025, which when executed by networking hardware 1010, causes the special-purpose network device 1002 to perform operations of one or more embodiments of the present invention as part networking software instances 1022.

The special-purpose network device 1002 is often physically and/or logically considered to include: 1) a ND control plane 1024 (sometimes referred to as a control plane) comprising the processor(s) 1012 that execute the control communication and configuration module(s) 1032A-R; and 2) a ND forwarding plane 1026 (sometimes referred to as a forwarding plane, a data plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the processor(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

FIG. 10B illustrates an exemplary way to implement the special-purpose network device 1002 according to some embodiments of the invention. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general purpose network device 1004 includes hardware 1040 comprising a set of one or more processor(s) 1042 (which are often COTS processors) and physical NIs 1046, as well as non-transitory machine readable storage media 1048 having stored therein software 1050. During operation, the processor(s) 1042 execute the software 1050 to instantiate one or more sets of one or more applications 1064A-R. While one embodiment does not implement virtualization, alternative embodiments may use different forms of virtualization. For example, in one such alternative embodiment the virtualization layer 1054 represents the kernel of an operating system (or a shim executing on a base operating system) that allows for the creation of multiple instances 1062A-R called software containers that may each be used to execute one (or more) of the sets of applications 1064A-R; where the multiple software containers (also called virtualization engines, virtual private servers, or jails) are user spaces (typically a virtual memory space) that are separate from each other and separate from the kernel space in which the operating system is rum and where the set of applications finning in a given user space, unless explicitly allowed, cannot access the memory of the other processes. In another such alternative embodiment the virtualization layer 1054 represents a hypervisor (sometimes referred to as a virtual machine monitor (VMM)) or a hypervisor executing on top of a host operating system, and each of the sets of applications 1064A-R is run on top of a guest operating system within an instance 1062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1040, directly on a hypervisor (in which case the unikernel is sometimes described as running within a LibOS virtual machine), or in a software container, embodiments can be implemented fully with unikernels running directly on a hypervisor represented by virtualization layer 1054, unikernels running within software containers represented by instances 1062A-R, or as a combination of unikernels and the above-described techniques (e.g., unikernels and virtual machines both run directly on a hypervisor, unikernels and sets of applications that are run in different software containers).

The instantiation of the one or more sets of one or more applications 1064A-R, as well as virtualization if implemented, are collectively referred to as software instance(s) 1052. Each set of applications 1064A-R, corresponding virtualization construct (e.g., instance 1062A-R) if implemented, and that part of the hardware 1040 that executes them (be it hardware dedicated to that execution and/or time slices of hardware temporally shared), forms a separate virtual network element(s) 1060A-R.

The virtual network element(s) 1060A-R perform similar functionality to the virtual network element(s) 1030A-R—e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1062A-R to VNEs also apply to embodiments where such a finer level of granularity and/or unikernels are used.

In certain embodiments, the virtualization layer 1054 includes a virtual switch that provides similar forwarding services as a physical Ethernet switch. Specifically, this virtual switch forwards traffic between instances 1062A-R and the physical NI(s) 1046, as well as optionally between the instances 1062A-R; in addition, this virtual switch may enforce network isolation between the VNEs 1060A-R that by policy are not permitted to communicate with each other (e.g., by honoring virtual local area networks (VLANs)).

Software 1050 can include code such as ILNP breakout component 1063, which when executed by processor(s) 1042, cause the general purpose network device 1004 to perform operations of one or more embodiments of the present invention as part software instances 1062A-R.

The third exemplary ND implementation in FIG. 10A is a hybrid network device 1006, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 10C illustrates various exemplary ways in which VNEs may be coupled according to some embodiments of the invention. FIG. 10C shows VNEs 1070A.1-1070A.P (and optionally VNEs 1070A.Q-1070A.R) implemented in ND 1000A and VNE 1070H.1 in ND 1000H. In FIG. 10C, VNEs 1070A.1-P are separate from each other in the sense that they can receive packets from outside ND 1000A and forward packets outside of ND 1000A; VNE 1070A.1 is coupled with VNE 1070H.1, and thus they communicate packets between their respective NDs; VNE 1070A.2-1070A.3 may optionally forward packets between themselves without forwarding them outside of the ND 1000A; and VNE 1070A.P may optionally be the first in a chain of VNEs that includes VNE 1070A.Q followed by VNE 1070A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more such servers (e.g., in the case of the general purpose network device 1004, one or more of the software instances 1062A-R may operate as servers; the same would be true for the hybrid network device 1006; in the case of the special-purpose network device 1002, one or more such servers could also be run on a virtualization layer executed by the processor(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 10D illustrates a network with a single network element on each of the NDs of FIG. 10A, and within this straight forward approach contrasts a traditional distributed approach (commonly used by traditional routers) with a centralized approach for maintaining reachability and forwarding information (also called network control), according to some embodiments of the invention. Specifically, FIG. 10D illustrates network elements (NEs) 1070A-H with the same connectivity as the NDs 1000A-H of FIG. 10A.

FIG. 10D illustrates that the distributed approach 1072 distributes responsibility for generating the reachability and forwarding information across the NEs 1070A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1070A-H (e.g., the processor(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1072 can be implemented on the general purpose network device 1004 and the hybrid network device 1006.

FIG. 10D illustrates that a centralized approach 1074 (also known as software defined networking (SDN)) that decouples the system that makes decisions about where traffic is sent from the underlying systems that forwards traffic to the selected destination. The illustrated centralized approach 1074 has the responsibility for the generation of reachability and forwarding information in a centralized control plane 1076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1076 has a south bound interface 1082 with a data plane 1080 (sometime referred to the infrastructure layer, network forwarding plane, or forwarding plane (which should not be confused with a ND forwarding plane)) that includes the NEs 1070A-H (sometimes referred to as switches, forwarding elements, data plane elements, or nodes). The centralized control plane 1076 includes a network controller 1078, which includes a centralized reachability and forwarding information module 1079 that determines the reachability within the network and distributes the forwarding information to the NEs 1070A-H of the data plane 1080 over the south bound interface 1082 (which may use the OpenFlow protocol). Thus, the network intelligence is centralized in the centralized control plane 1076 executing on electronic devices that are typically separate from the NDs. In one embodiment, the network controller 1078 may include an ILNP breakout component 1081 that when executed by the network controller 1078, causes the network controller 1078 to perform operations of one or more embodiments described herein above.

For example, where the special-purpose network device 1002 is used in the data plane 1080, each of the control communication and configuration module(s) 1032A-R of the ND control plane 1024 typically include a control agent that provides the VNE side of the south bound interface 1082. In this case, the ND control plane 1024 (the processor(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1076 to receive the forwarding information (and in some cases, the reachability information) from the centralized reachability and forwarding information module 1079 (it should be understood that in some embodiments of the invention, the control communication and configuration module(s) 1032A-R, in addition to communicating with the centralized control plane 1076, may also play some role in determining reachability and/or calculating forwarding information—albeit less so than in the case of a distributed approach; such embodiments are generally considered to fall under the centralized approach 1074, but may also be considered a hybrid approach).

While the above example uses the special-purpose network device 1002, the same centralized approach 1074 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1076 to receive the forwarding information (and in some cases, the reachability information) from the centralized reachability and forwarding information module 1079; it should be understood that in some embodiments of the invention, the VNEs 1060A-R, in addition to communicating with the centralized control plane 1076, may also play some role in determining reachability and/or calculating forwarding information—albeit less so than in the case of a distributed approach) and the hybrid network device 1006. In fact, the use of SDN techniques can enhance the NFV techniques typically used in the general purpose network device 1004 or hybrid network device 1006 implementations as NFV is able to support SDN by providing an infrastructure upon which the SDN software can be run, and NFV and SDN both aim to make use of commodity server hardware and physical switches.

FIG. 10D also shows that the centralized control plane 1076 has a north bound interface 1084 to an application layer 1086, in which resides application(s) 1088. The centralized control plane 1076 has the ability to form virtual networks 1092 (sometimes referred to as a logical forwarding plane, network services, or overlay networks (with the NEs 1070A-H of the data plane 1080 being the underlay network)) for the application(s) 1088. Thus, the centralized control plane 1076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1072 separate from the centralized approach 1074, the effort of network control may be distributed differently or the two combined in certain embodiments of the invention. For example: 1) embodiments may generally use the centralized approach (SDN) 1074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1074, but may also be considered a hybrid approach.

While FIG. 10D illustrates the simple case where each of the NDs 1000A-H implements a single NE 1070A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1078 may also emulate the implementation of multiple VNEs in a single ND. Specifically, instead of (or in addition to) implementing multiple VNEs in a single ND, the network controller 1078 may present the implementation of a VNE/NE in a single ND as multiple VNEs in the virtual networks 1092 (all in the same one of the virtual network(s) 1092, each in different ones of the virtual network(s) 1092, or some combination). For example, the network controller 1078 may cause an ND to implement a single VNE (a NE) in the underlay network, and then logically divide up the resources of that NE within the centralized control plane 1076 to present different VNEs in the virtual network(s) 1092 (where these different VNEs in the overlay networks are sharing the resources of the single VNE/NE implementation on the ND in the underlay network).

On the other hand, FIGS. 10E and 10F respectively illustrate exemplary abstractions of NEs and VNEs that the network controller 1078 may present as part of different ones of the virtual networks 1092. FIG. 10E illustrates the simple case of where each of the NDs 1000A-H implements a single NE 1070A-H (see FIG. 10D), but the centralized control plane 1076 has abstracted multiple of the NEs in different NDs (the NEs 1070A-C and G-H) into (to represent) a single NE 1070I in one of the virtual network(s) 1092 of FIG. 10D, according to some embodiments of the invention. FIG. 10E shows that in this virtual network, the NE 1070I is coupled to NE 1070D and 1070F, which are both still coupled to NE 1070E.

FIG. 10F illustrates a case where multiple VNEs (VNE 1070A.1 and VNE 1070H.1) are implemented on different NDs (ND 1000A and ND 1000H) and are coupled to each other, and where the centralized control plane 1076 has abstracted these multiple VNEs such that they appear as a single VNE 1070T within one of the virtual networks 1092 of FIG. 10D, according to some embodiments of the invention. Thus, the abstraction of a NE or VNE can span multiple NDs.

While some embodiments of the invention implement the centralized control plane 1076 as a single entity (e.g., a single instance of software running on a single electronic device), alternative embodiments may spread the functionality across multiple entities for redundancy and/or scalability purposes (e.g., multiple instances of software running on different electronic devices).

Figure 11:
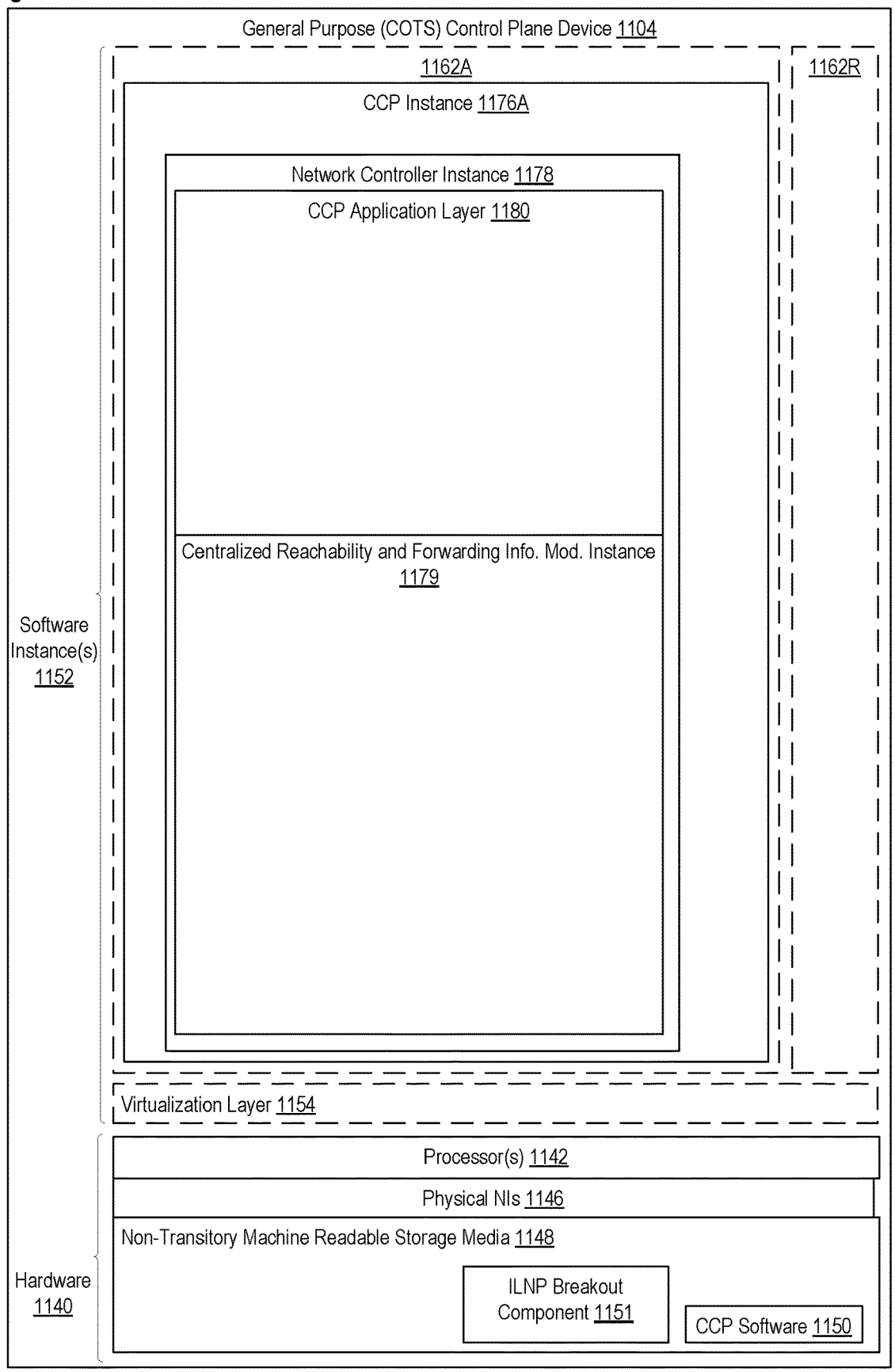
FIG. 11 illustrates a general purpose control plane device with centralized control plane (CCP) software 1150), according to some embodiments.

Similar to the network device implementations, the electronic device(s) running the centralized control plane 1076, and thus the network controller 1078 including the centralized reachability and forwarding information module 1079, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 11 illustrates, a general purpose control plane device 1104 including hardware 1140 comprising a set of one or more processor(s) 1142 (which are often COTS processors) and physical NIs 1146, as well as non-transitory machine readable storage media 1148 having stored therein centralized control plane (CCP) software 1150 and an ILNP breakout component 1151.

In embodiments that use compute virtualization, the processor(s) 1142 typically execute software to instantiate a virtualization layer 1154 (e.g., in one embodiment the virtualization layer 1154 represents the kernel of an operating system (or a shim executing on a base operating system) that allows for the creation of multiple instances 1162A-R called software containers (representing separate user spaces and also called virtualization engines, virtual private servers, or jails) that may each be used to execute a set of one or more applications; in another embodiment the virtualization layer 1154 represents a hypervisor (sometimes referred to as a virtual machine monitor (VMM)) or a hypervisor executing on top of a host operating system, and an application is run on top of a guest operating system within an instance 1162A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1140, directly on a hypervisor represented by virtualization layer 1154 (in which case the unikernel is sometimes described as running within a LibOS virtual machine), or in a software container represented by one of instances 1162A-R). Again, in embodiments where compute virtualization is used, during operation an instance of the CCP software 1150 (illustrated as CCP instance 1176A) is executed (e.g., within the instance 1162A) on the virtualization layer 1154. In embodiments where compute virtualization is not used, the CCP instance 1176A is executed, as a unikernel or on top of a host operating system, on the "bare metal" general purpose control plane device 1104. The instantiation of the CCP instance 1176A, as well as the virtualization layer 1154 and instances 1162A-R if implemented, are collectively referred to as software instance(s) 1152.

In some embodiments, the CCP instance 1176A includes a network controller instance 1178. The network controller instance 1178 includes a centralized reachability and forwarding information module instance 1179 (which is a middleware layer providing the context of the network controller 1078 to the operating system and communicating with the various NEs), and an CCP application layer 1180 (sometimes referred to as an application layer) over the middleware layer (providing the intelligence required for various network operations such as protocols, network situational awareness, and user-interfaces). At a more abstract level, this CCP application layer 1180 within the centralized control plane 1076 works with virtual network view(s) (logical view(s) of the network) and the middleware layer provides the conversion from the virtual networks to the physical view.

The ILNP breakout component 1151 can be executed by hardware 1140 to perform operations of one or more embodiments of the present invention as part of software instances 1152.

The centralized control plane 1076 transmits relevant messages to the data plane 1080 based on CCP application layer 1180 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1080 may receive different messages, and thus different forwarding information. The data plane 1080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1080, the packet (or a subset of the packet header and content) is typically forwarded to the centralized control plane 1076. The centralized control plane 1076 will then program forwarding table entries into the data plane 1080 to accommodate packets belonging to the flow of the unknown packet. Once a specific forwarding table entry has been programmed into the data plane 1080 by the centralized control plane 1076, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device functioning as a source evolved universal terrestrial radio access network (E-UTRAN) node B (eNodeB) in a cellular communication network to support incremental deployment of identifier locator network protocol (ILNP) breakout in the cellular communication network, the method comprising:

advertising a first access point name (APN) and a second APN to a user equipment (UE), wherein the first APN is associated with a user plane packet gateway (P-GWu) that is implemented at the source eNodeB, and wherein the second APN is associated with a packet gateway (P-GW) in a core of the cellular communication network;

establishing a first PDN session associated with the first APN;

establishing a second PDN session associated with the second APN;

receiving, from the UE via the first PDN session, a first packet destined for a first Correspondent Node (CN), wherein the first packet is received from the UE via the first PDN session as opposed to the second PDN session because the UE determined that the first CN is ILNP capable;

forwarding the first packet to the first CN via the P-GWu implemented at the source eNodeB;

receiving, from the UE via the second PDN session, a second packet destined for a second CN; and forwarding the second packet to the second CN via the P-GW in the core of the cellular communication network.

2. The method of claim 1, further comprising:

determining that the UE is to be handed over to a target eNodeB that has ILNP breakout capability;

sending a handover request message to the target eNodeB;

receiving, from the first CN, a third packet destined for the UE via the P-GWu after the UE has disconnected from the source eNodeB;

overwriting a destination locator in a header of the third packet with a locator associated with the target eNodeB; and forwarding the third packet to the target eNodeB.

3. The method of claim 1, further comprising:

determining that the UE is to be handed over to a target eNodeB that does not have ILNP breakout capability;

sending a handover request message to the target eNodeB;

receiving, from the first CN, a third packet destined for the UE via the P-GWu after the UE has disconnected from the source eNodeB, wherein the third packet is an ILNP packet;

overwriting a destination locator in a header of the third packet with a prefix associated with the P-GW; and forwarding the third packet to the target eNodeB over an X2 tunnel associated with the second PDN session.

4. The method of claim 1, further comprising receiving a third packet destined for a second UE that is not connected to the source eNodeB;

querying a mobility management entity (MME) for a locator of the second UE;

receiving a reply from the MME indicating the locator of the second UE;

overwriting a destination locator in a header of the third packet with the locator received from the MME; and forwarding the third packet.

5. A network device to function as a source evolved universal terrestrial radio access network (E-UTRAN) node B (eNodeB) in a cellular communication network that supports incremental deployment of identifier locator network protocol (ILNP) breakout in the cellular communication network, the network device comprising:

a set of one or more processors; and a non-transitory computer-readable medium having stored therein an ILNP breakout component, which when executed by the set of one or more processors, causes the network device to advertise a first access point name (APN) and a second APN to a user equipment (UE), wherein the first APN is associated with a user plane packet gateway (P-GWu) that is implemented at the source eNodeB, and wherein the second APN is associated with a packet gateway (P-GW) in a core of the cellular communication network, establish a first PDN session associated with the first APN, establish a second PDN session associated with the second APN, receive, from the UE via the first PDN session, a first packet destined for a first Correspondent Node (CN), wherein the first packet is received from the UE via the first PDN session as opposed to the second PDN session because the UE determined that the first CN is ILNP capable, forward the first packet to the first CN via the P-GWu implemented at the source eNodeB, receive, from the UE via the second PDN session, a second packet destined for a second CN, and forward the second packet to the second CN via the P-GW in the core of the cellular communication network.

6. The network device of claim 5, wherein the ILNP breakout component, when executed by the set of one or more processors, further causes the network device to determine that the UE is to be handed over to a target eNodeB that has ILNP breakout capability, send a handover request message to the target eNodeB, receive, from the first CN, a third packet destined for the UE via the P-GWu after the UE has disconnected from the source eNodeB, overwrite a destination locator in a header of the third packet with a locator associated with the target eNodeB, and forward the third packet to the target eNodeB.

7. The network device of claim 5, wherein the ILNP breakout component, when executed by the set of one or more processors, further causes the network device to determine that the UE is to be handed over to a target eNodeB that does not have ILNP breakout capability, send a handover request message to the target eNodeB, receive, from the first CN, a third packet destined for the UE via the P-GWu after the UE has disconnected from the source eNodeB, wherein the third packet is an ILNP packet, overwrite a destination locator in a header of the third packet with a prefix associated with the P-GW, and forward the third packet to the target eNodeB over an X2 General Packet Radio Service (GPRS) Tunneling Protocol (GTP) tunnel associated with the second PDN session.

8. A user equipment (UE) to operate in a cellular communication network that supports incremental deployment of identifier locator network protocol (ILNP) breakout in the cellular communication network, the UE comprising:
a set of one or more processors; and
a non-transitory computer-readable medium having stored therein an ILNP breakout component, which when executed by the set of one or more processors, causes the UE to receive an advertisement for a first access point name (APN) and a second APN from a source evolved universal terrestrial radio access network (E-UTRAN) node B (eNodeB), wherein the first APN is associated with a user plane packet gateway (P-GWu) that is implemented at the source eNodeB, and wherein the second APN is associated with a packet gateway (P-GW) in a core of the cellular communication network, establish a first PDN session associated with the first APN, establish a second PDN session associated with the second APN, send traffic destined for a first Correspondent Node (CN) that is ILNP capable via the first PDN session, and send traffic destined for a second CN that is not ILNP capable via the second PDN session.

9. The UE of claim 8, wherein the ILNP breakout component, when executed by the set of one or more processors, further causes the UE to receive an indication from the source eNodeB that the UE is to be handed over to a target eNodeB, disconnect from the source eNodeB, connect to the target eNodeB, and send a redirect message to the first CN that indicates how the UE can be reached.

10. The UE of claim 9, wherein the target eNodeB has ILNP breakout capability, and wherein the redirect message indicates that the UE can be reached using a locator assigned to the UE at the target eNodeB.

11. The UE of claim 10, wherein the ILNP breakout component, when executed by the set of one or more processors, further causes the UE to receive traffic buffered at the target eNodeB that was forwarded by the source eNodeB to the target eNodeB.

12. The UE of claim 9, wherein the target eNodeB does not have ILNP breakout capability, and wherein the redirect message indicates that the UE can be reached using a locator associated with the P-GW in the core of the cellular communication network.

13. The UE of claim 9, wherein the redirect message is an Internet Control Message Protocol (ICMP) redirect message.

14. The UE of claim 9, wherein the ILNP breakout component, when executed by the set of one or more processors, further causes the UE to send an update message to a mapping server that indicates how the UE can be reached.

* * * * *